(12) United States Patent
Chemberlen

(10) Patent No.: US 12,134,142 B1
(45) Date of Patent: Nov. 5, 2024

(54) SYSTEMS AND METHODS OF PERMANENTLY MARKING MATERIALS

(71) Applicant: Flexform, Incorporated, Santa Ana, CA (US)

(72) Inventor: Christopher H. Chemberlen, Santa Ana, CA (US)

( * ) Notice: Subject to any disclaimer, the term of this patent is extended or adjusted under 35 U.S.C. 154(b) by 414 days.

(21) Appl. No.: 17/168,879

(22) Filed: Feb. 5, 2021

Related U.S. Application Data

(60) Provisional application No. 62/971,829, filed on Feb. 7, 2020.

(51) Int. Cl.
*B23K 26/40* (2014.01)
*B23K 26/0622* (2014.01)
*B23K 103/00* (2006.01)

(52) U.S. Cl.
CPC .......... *B23K 26/40* (2013.01); *B23K 26/0622* (2015.10); *B23K 2103/50* (2018.08)

(58) Field of Classification Search
CPC .. B23K 26/40; B23K 26/0622; B23K 26/062; B23K 26/06; B23K 2103/50
See application file for complete search history.

(56) References Cited

U.S. PATENT DOCUMENTS

| | | | |
|---|---|---|---|
| 10,305,252 B2 * | 5/2019 | Muendel | H01S 5/4012 |
| 10,752,534 B2 * | 8/2020 | Nieber | B32B 17/10036 |
| 2006/0108337 A1 * | 5/2006 | Gu | B23K 26/40 |
| | | | 219/121.61 |
| 2012/0264207 A1 * | 10/2012 | Sharpe | G03C 1/733 |
| | | | 435/307.1 |
| 2015/0038313 A1 * | 2/2015 | Hosseini | B23K 26/0648 |
| | | | 219/121.75 |
| 2015/0165548 A1 * | 6/2015 | Marjanovic | C03B 33/091 |
| | | | 219/121.73 |
| 2019/0092080 A1 * | 3/2019 | Sugdon | B42D 25/351 |

\* cited by examiner

*Primary Examiner* — Dana Ross
*Assistant Examiner* — Adam M Eckardt
(74) *Attorney, Agent, or Firm* — EDISON LAW GROUP

(57) ABSTRACT

Systems and methods of permanently marking a material containing an opacification material may include marking the material with a laser system. The laser system may be an ultraviolet system, and the laser may be a solid state diode pumped and pulsed 4 watt to 55 watt unit with a minimum scan speed of 3 meters/second and a minimum frequency of 30 KHz.

22 Claims, 18 Drawing Sheets

SYSTEMS AND METHODS OF PERMANENTLY MARKING MATERIALS

INCORPORATION BY REFERENCE

This application claims the benefit of U.S. Provisional Patent Application No. 62/971,829, filed Feb. 7, 2020, which is incorporated in its entirety by reference herein. This application also includes an Appendix (GS1 DataMatrix Guideline Release 2.5.1, Ratified, January 2018), which is incorporated in its entirety by reference and is a part of this application.

BACKGROUND

Field

The embodiments described herein relate generally to placing permanent marks on materials, and more particularly, to systems and methods of permanently marking polymer materials containing an opacification material.

Description of the Related Art

One aspect of the present invention is the recognition that it would be desirable to place permanent markings on certain materials, such as polymer materials, particularly those that include an opacification material (e.g., titanium dioxide). In particular, it would be desirable to mark such materials with clarity, without damaging the material, and at a speed great enough to allow for the marking of complete and multiple package labels with associated barcodes, and to allow for serialization marks to identify package position within a continuous packaging run of a product lot.

Therefore, what is needed are systems and methods with the capability to provide multiple lines of marks on such materials at a fast rate without compromising the integrity thereof.

SUMMARY

Some embodiments of the present disclosure include systems and methods of permanently marking polymer materials containing an opacification material and other polymer types without an opacification material, utilizing an ultraviolet (UV) laser and high speed scanning (Galvanometer) system and large field optics (e.g., up to 500 mm×500 mm), without damaging the substrate material. The systems and methods may include marking the material with a laser system. In some instances, the laser system may be a 355±0.1 nm ultraviolet system, and the laser may be a diode pumped solid state and pulsed 4 watt to 55 watt unit with a minimum scan speed of 3 meters/second and a minimum pulse frequency of 30 KHz. In other applications, for example with other materials, other laser systems may be used including but not limited to 355±0.5 nm, 355±1 nm, 355±2 nm, 355±3 nm, 355±4 nm, or 355±5 nm systems.

An additional feature of the identified marking system is its ability to place permanent marks without ablation of other markings, for complete package labels, in a large marking field when the system has been incorporated into a web fed intermittent or continuous motion packaging machine, and maintain, e.g., a 1-25 cycle per minute line speed. The application of other laser marking technology has been previously incorporated into conveyorized container lines and for the marking of "lot codes" and "use by" dating, along with marking of barcodes and logos on products. Other systems and methods may be utilized to ablate a preprinted and contrasting ink color from a substrate material to generate a code or set of characters. Utilizing other systems and methods may not allow for an efficient and large field marking, and may use additional processes and manufacturing costs to be implemented.

Various implementations of a method of permanently marking polymer material containing an opacification material are provided. The method can include providing the polymer material containing the opacification material, and providing a laser system. The laser system can comprise a pulsed ultraviolet laser with an average output power of 4 to 55 W. The method can also include marking the polymer material with the laser system at a minimum scan speed of 3 meters/second and a minimum pulse frequency of 30 KHz. The laser system can produce less than 10 microns of cratering in the polymer material.

In certain implementations, the laser system can comprise a 355±0.1 nm ultraviolet laser. The average output power of the laser system can be from e.g., 4 W to 40 W, from 4 W to 20 W, or from 8 W to 20 W. In some instances, the scan speed can be from e.g., 3 meters/second to 8 meters/second or from 6 meters/second to 8 meters/second. In some instances, the pulse frequency can be from 30 to 50 KHz. In various instances, the laser system can produce less than 7 microns, less than 5 microns, less than 3 microns, or less than 1 micron of cratering in the polymer material.

In various methods, the laser system can be capable of marking 500 characters in 10 to 15 point font, a 2D barcode, and human readable identification characters in the polymer material within 5 seconds, or within 3 second.

In various methods, the laser system can be capable of marking a 2D barcode in the polymer material. In some instances, the 2D barcode can have a marking quality within an ISO/IEC 15415:2011 symbol grade of at least 2.0, 3.0, or 4.0 for an aperture, light, and angle or a February 2011 ANSI grade of at least C, B, or A pursuant to the 2015 2D Barcode Verification Process Implementation Guideline per GS1 DataMatrix Guideline Release 2.5.1, Ratified, January 2018. In some instances, the 2D barcode can meet the ISO/IEC 15415:2011 standards for one, some or all of the individual criteria of decode, symbol contrast, axis nonuniformity, modulation, grid nonuniformity, unused error correction, fixed pattern damage, and print growth. In some instances, the 2D barcode can meet the May 19, 2015 American Standard AS 9132. In some instances, the 2D barcode can meet the May 19, 2015 American Standard AS 9132 standards for one, some or all of the individual criteria of angle of distortion, filled cells, centre point discrepancy, elongation, number of dots per element, and quiet zone. In some instances, the 2D barcode can meet ISO/IEC TR 29158:2020 Direct Part Mark Quality Guideline. In some instances, the 2D barcode can meet ISO/IEC TR 29158:2020 standards for one, some or all of the individual criteria of decode, symbol contrast, axis nonuniformity, modulation, grid nonuniformity, unused error correction, fixed pattern damage, and print growth. In some instances, the 2D barcode can meet ISO/IEC TR 29158:2020 standards for individual criteria of modulation within a cell and/or minimum reflectance.

In various implementations, the polymer material can comprise spunbound polyolefin or hydro entanglement generated polyolefin fibrous sheeting. In some instances, the polymer material can comprise high density polyethylene. In some instances, the polymer material can comprise solid polymer sheeting. In some instances, the polymer material can comprise polycarbonate, polyethylene terephthalate, acryonitrile butadiene styrene, or polyvinyl chloride. In various examples, the opacification material can comprise titanium dioxide.

Various implementations of a system configured to permanently mark a material are provided. The system can include a laser system having a marking field, and a packaging machine in communication with the laser system. The packaging machine can be configured to hold a portion of the material within the marking field of the laser system for a period of time. Upon receiving a signal from the packaging machine, the laser system can be configured to mark the portion of the material within the marking field of the laser system within the period of time. Upon receiving a signal from the laser system, the packaging machine can be configured to feed the marked portion out of the marking field of the laser system and feed a successive portion of the material into the marking field of the laser system. The laser system can be configured to mark the respective portion of the material and the packaging machine can be configured to feed the respective marked portion of the material out of the marking field of the laser system for a designated number of cycles. In some systems, the period of time can be within 4 seconds and/or the number of cycles can be from e.g., 1 to 12 cycles, at least 5 cycles, or from 5 to 15 cycles.

Various systems can include a temperature control system. For example, the temperature control system can include a liquid coolant chilling system to control the temperature of the laser system.

In various systems, the laser system can comprise a pulsed ultraviolet laser with an average output power of 4 to 55 W, a minimum scan speed of 3 meters/second, and a minimum pulse frequency of 30 KHz. In some instances, the laser system can comprise a 355±0.1 nm ultraviolet laser. Other laser systems may also be used.

BRIEF DESCRIPTION OF THE DRAWINGS

Having thus described the invention in general terms, reference is now made to the accompanying figures, which show different views of different example embodiments.

Figure 1:
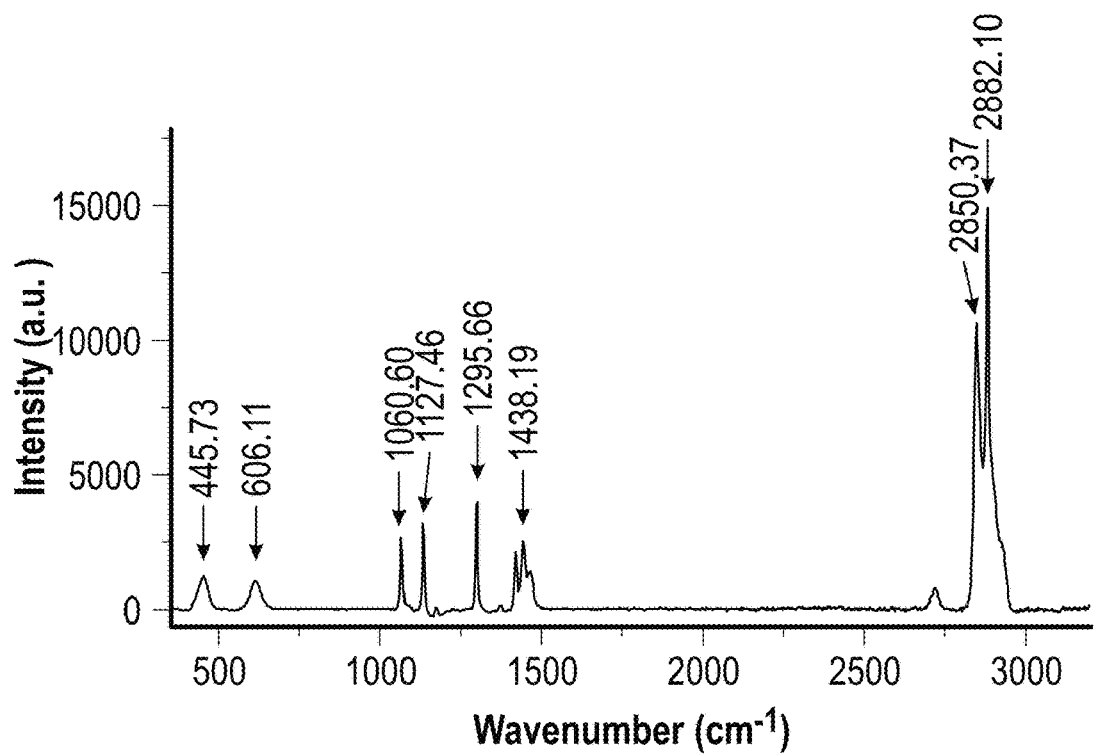

FIG. 1 is a plot of the Raman spectrum acquired from the white (unmarked) area of a laser marked sheet of high density polyethylene (HDPE).

Figure 2:
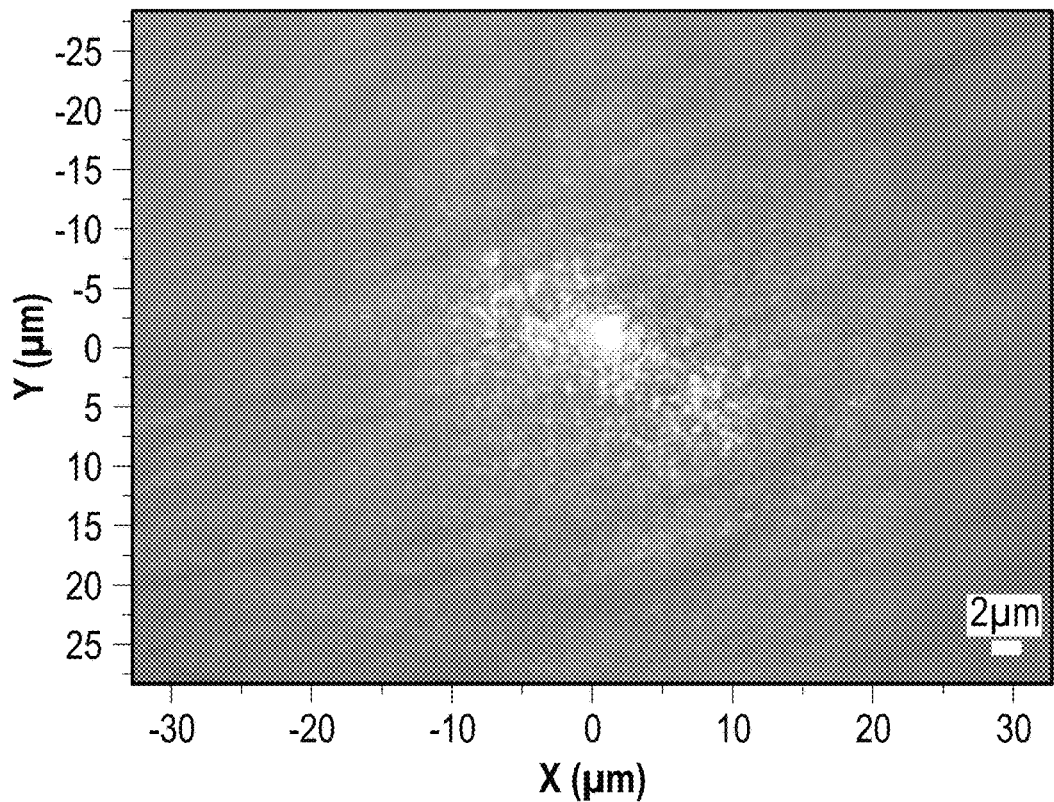

FIG. 2 is a microscope image of the laser marked sheet of HDPE.

Figure 3:
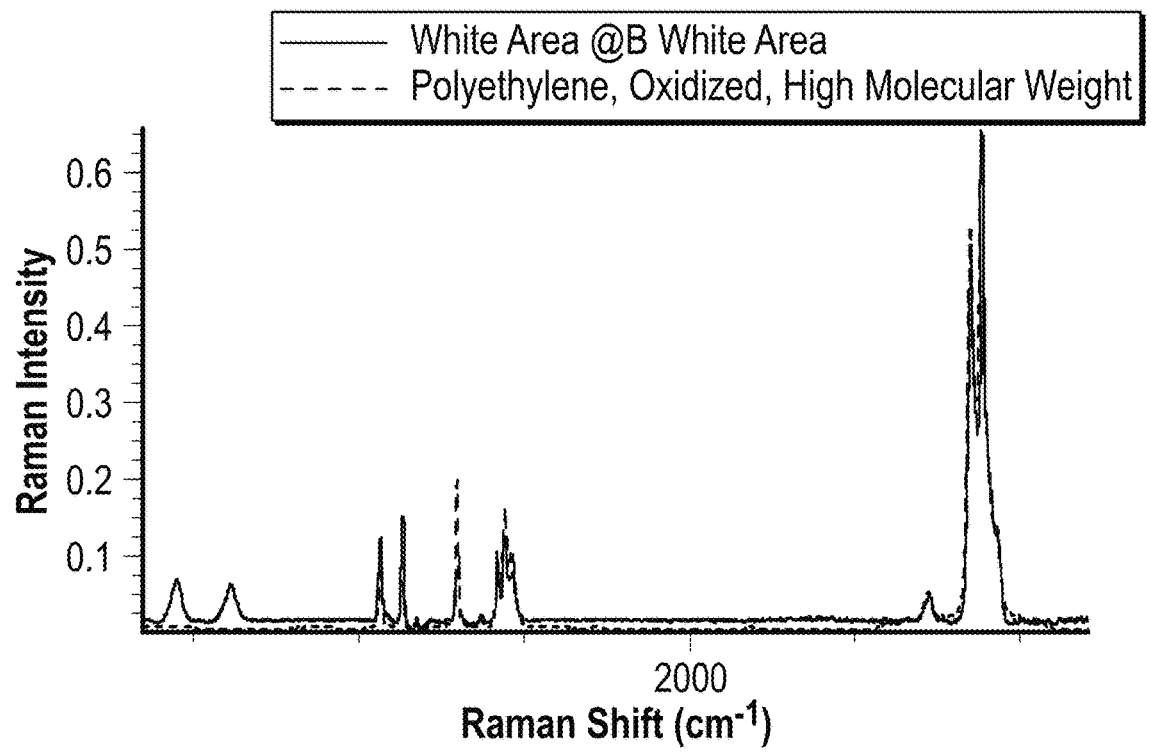

FIG. 3 is the plot shown in FIG. 1 overlaid with the spectrum of HDPE.

Figure 4:
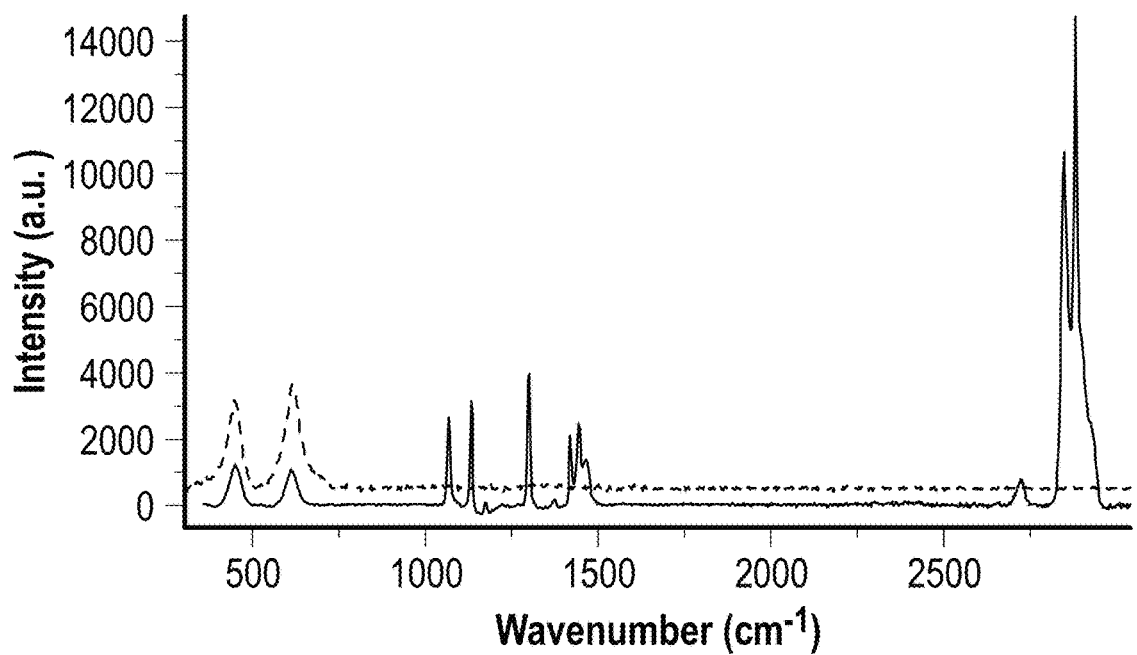

FIG. 4 is the plot shown in FIG. 1 overlaid with the bands of $TiO_2$ in rutile form.

Figure 5:
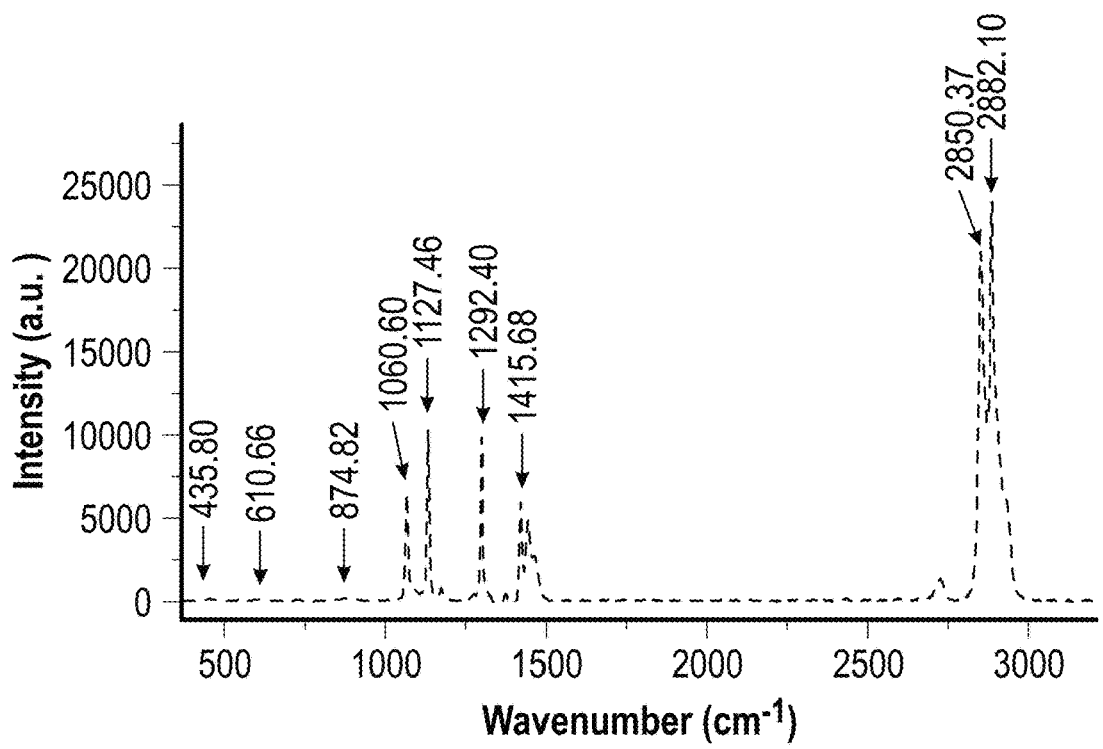

FIG. 5 is a plot of the Raman spectrum acquired from the grey (marked) area of a laser marked sheet of HDPE.

Figure 6:
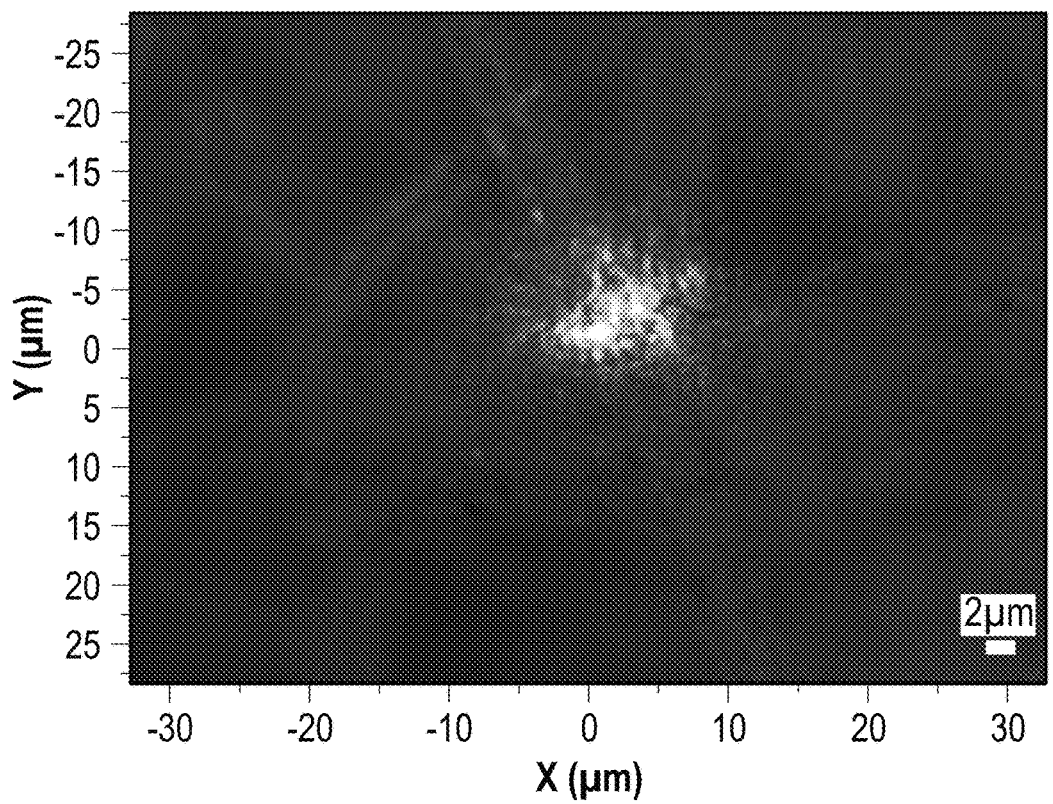

FIG. 6 is a microscope image of the laser marked sheet of HDPE.

Figure 7:
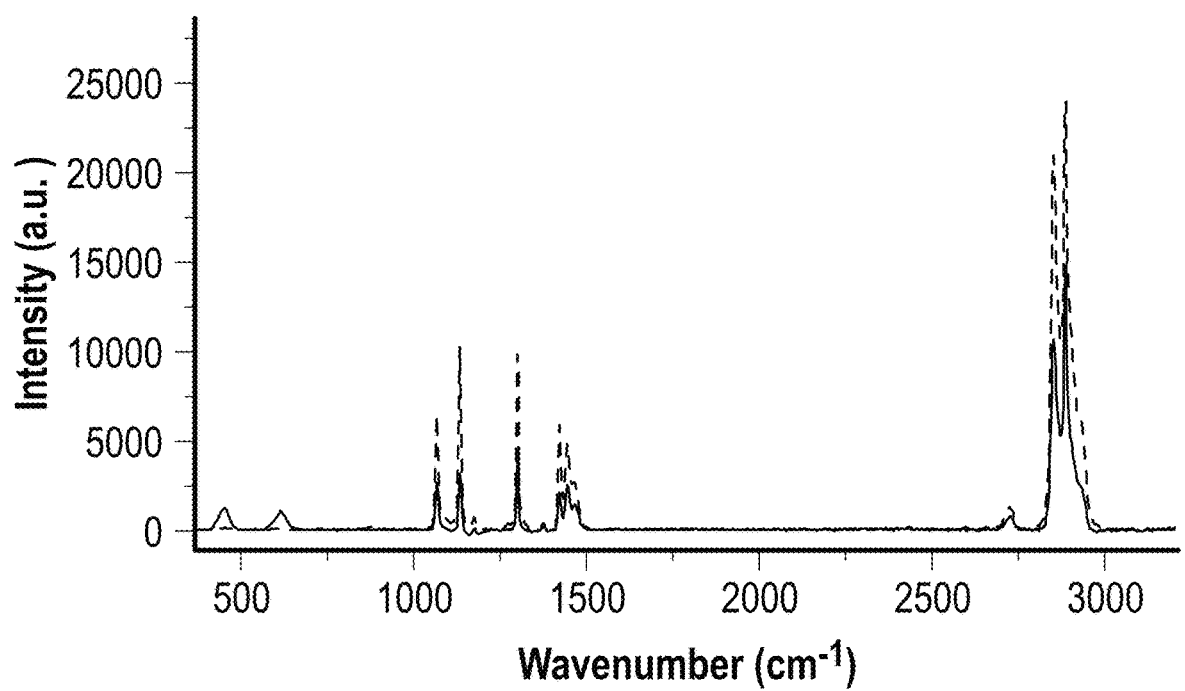

FIG. 7 is a plot of FIG. 5 overlaid with the plot FIG. 1.

Figure 8:
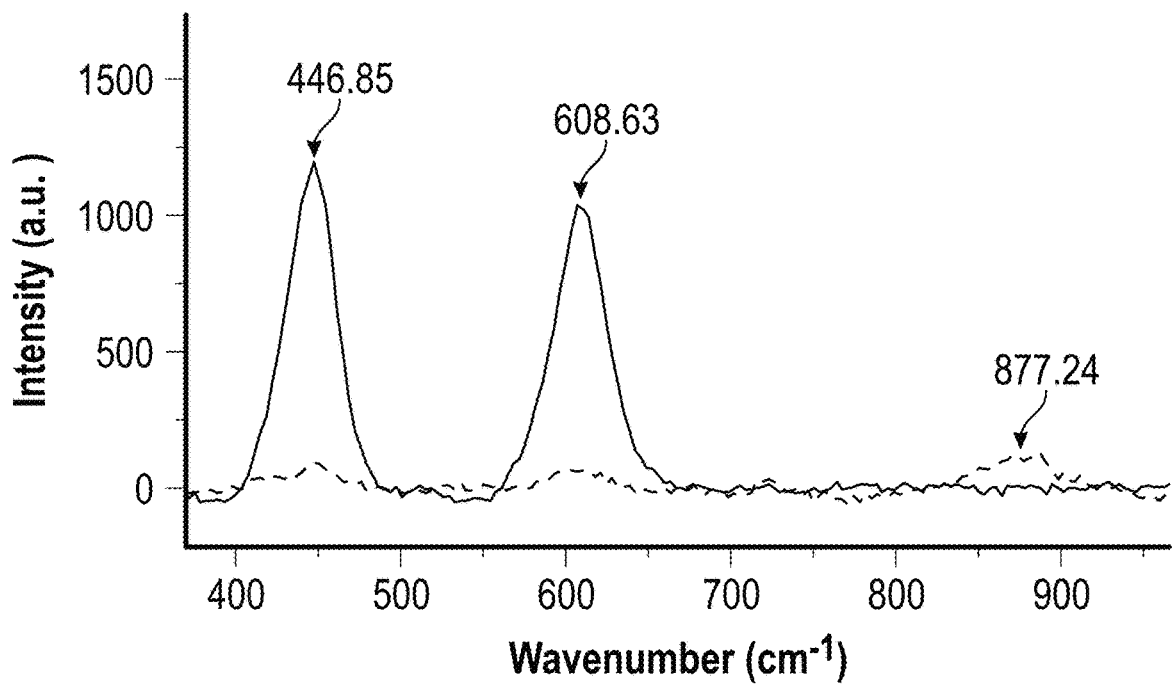

FIG. 8 is FIG. 7 at the lower wavelengths.

Figure 9:
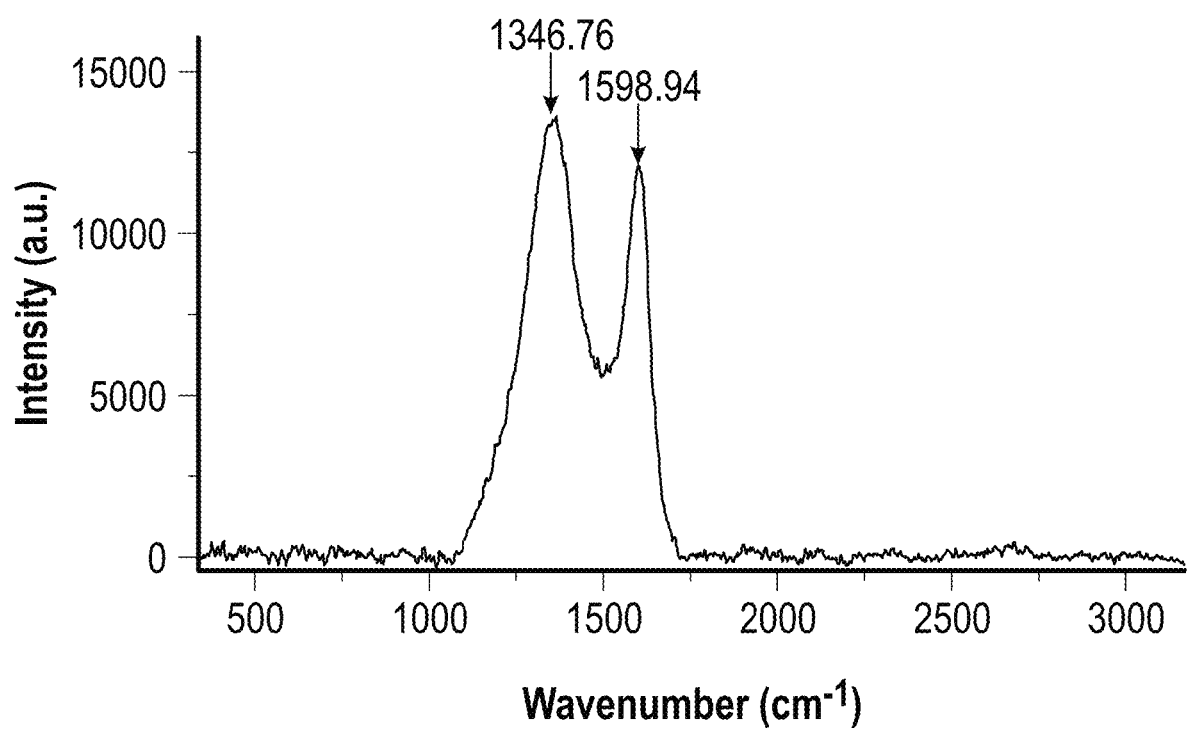

FIG. 9 is a reference spectrum of carbon black.

Figure 10:
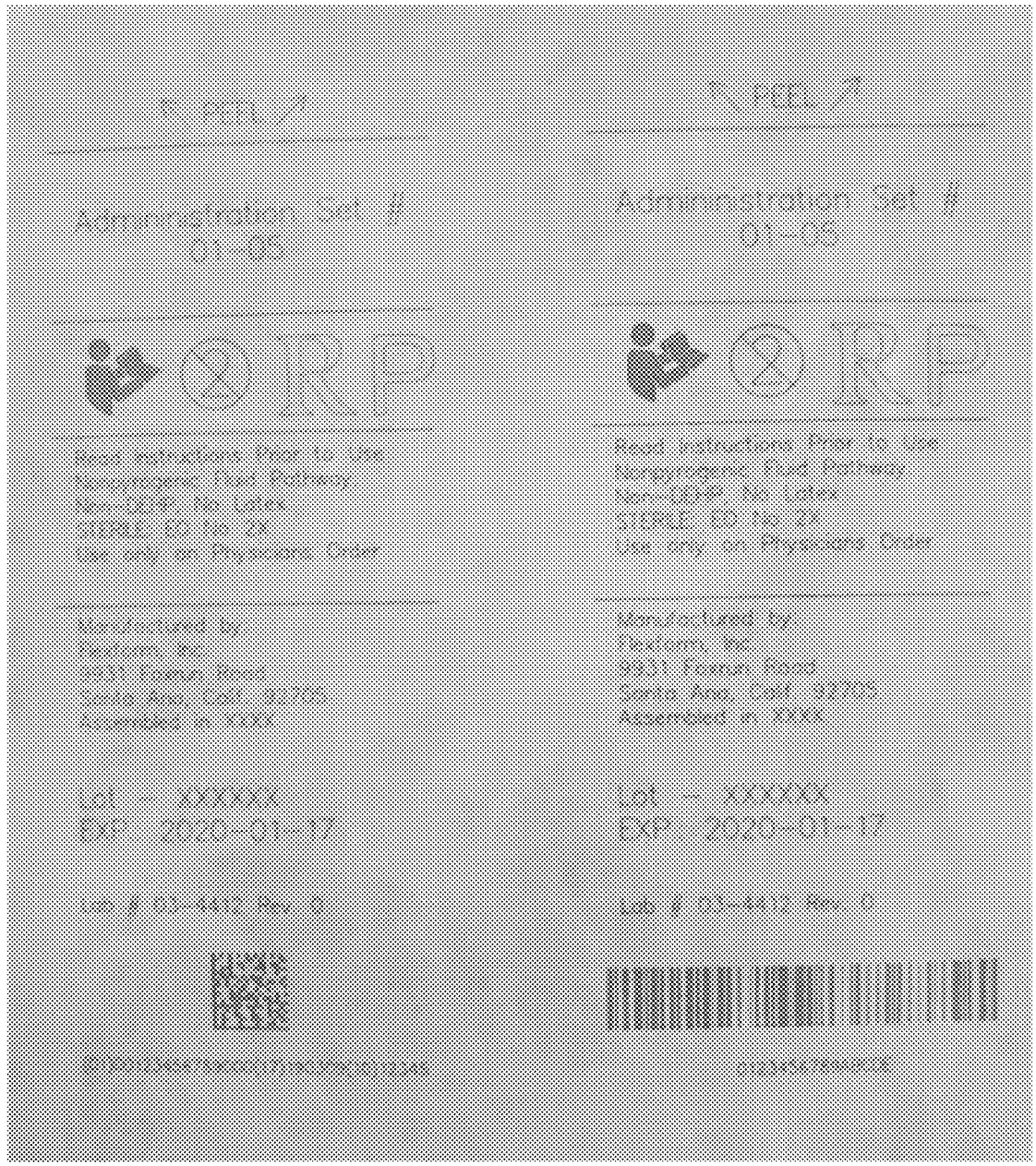

FIG. 10 shows an example pair of package labels marked with an 8 W ultraviolet laser.

Figure 11:
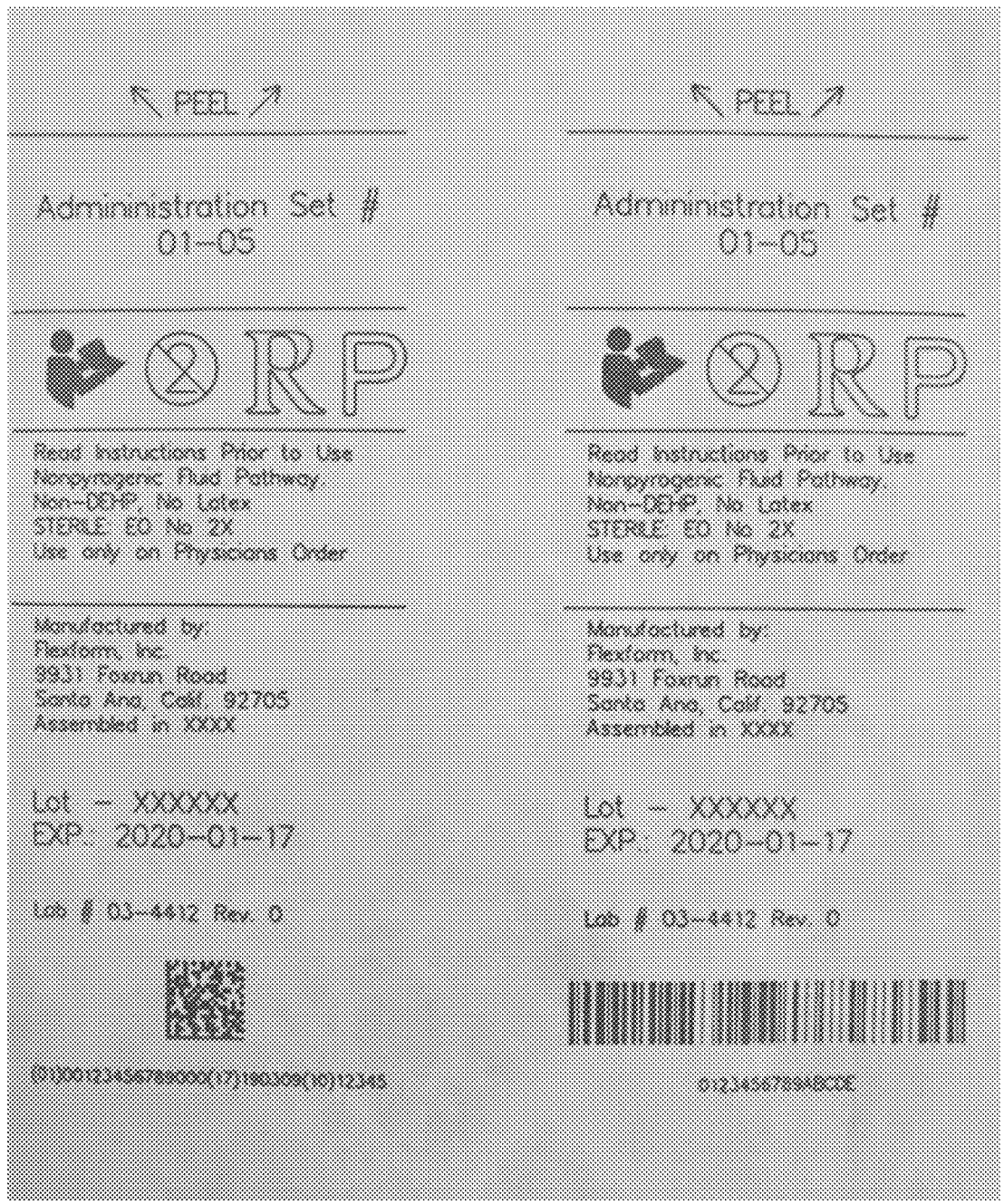

FIG. 11 shows an example pair of package labels marked with a 20 W ultraviolet laser.

Figure 12A:

FIG. 12A shows an example laser marking generated with a 20 W ultraviolet laser.

Figure 12B:
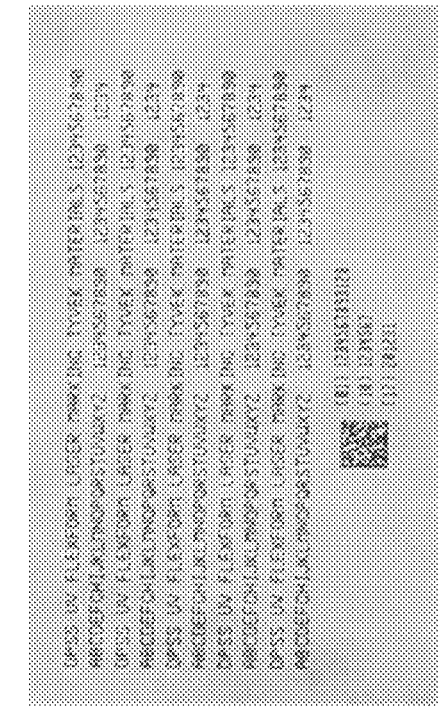

FIG. 12B shows one of the four labels in FIG. 12A.

Figure 12C:
Figure 13B:
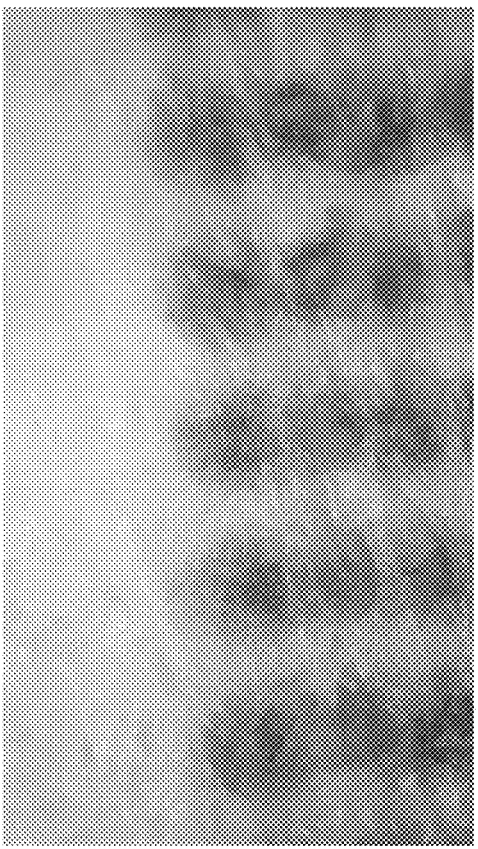
Figure 13D:
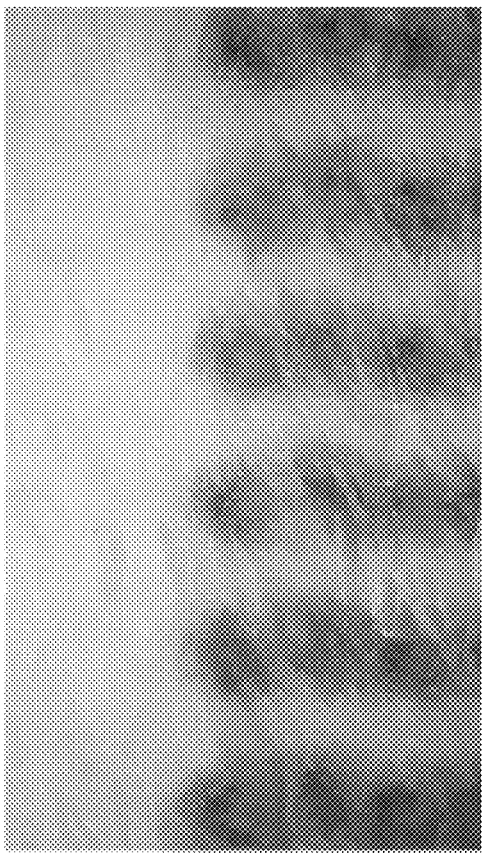
Figure 13A:
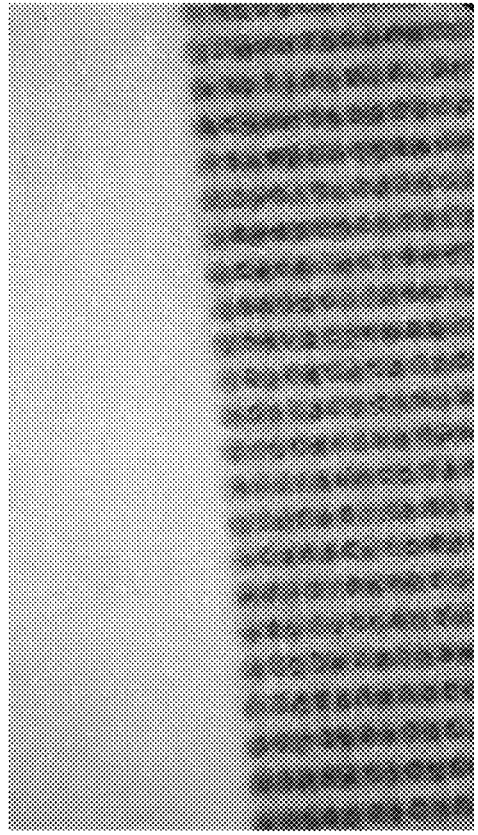
Figure 13C:
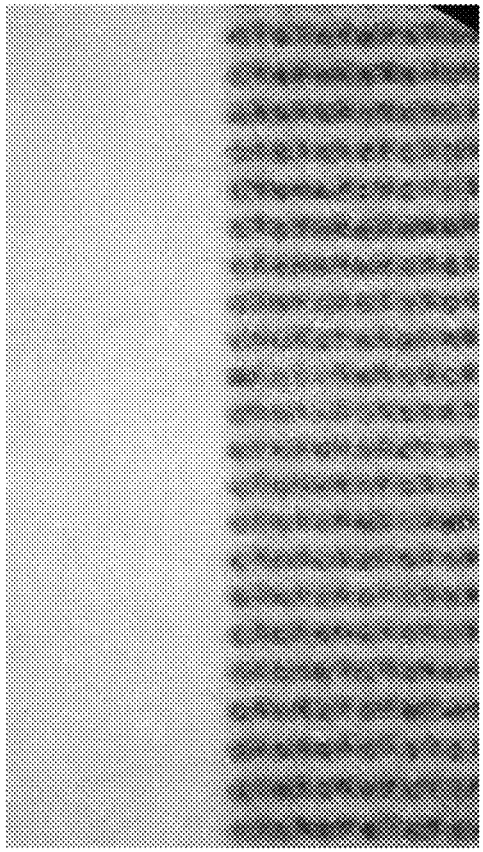

FIG. 12C shows one of four labels generated with an 8 W ultraviolet laser.

FIGS. 13A-13D show images of two marked sections of a laser marked material using a 3 W laser.

Figure 14A:
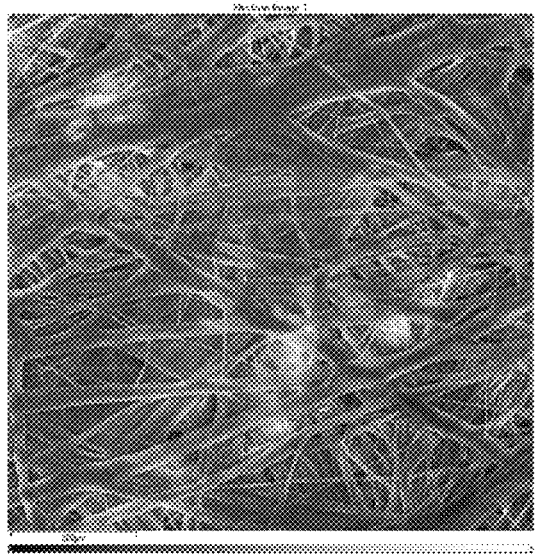
Figure 14B:
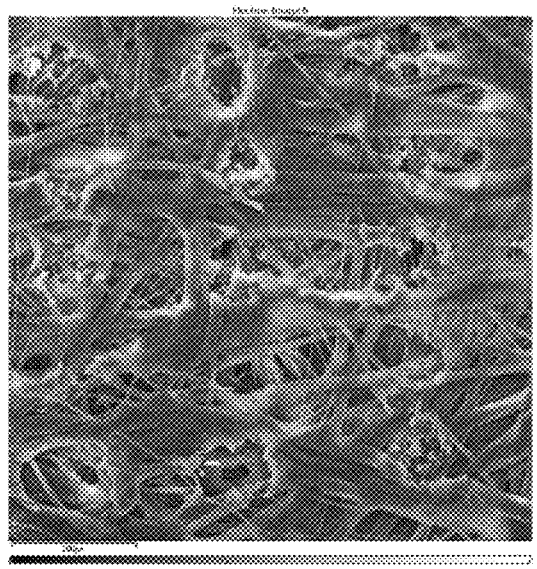

FIGS. 14A-14B are 500× images of the white and grey areas respectively of a laser marked material using a 3 W ultraviolet laser.

Figure 15A:
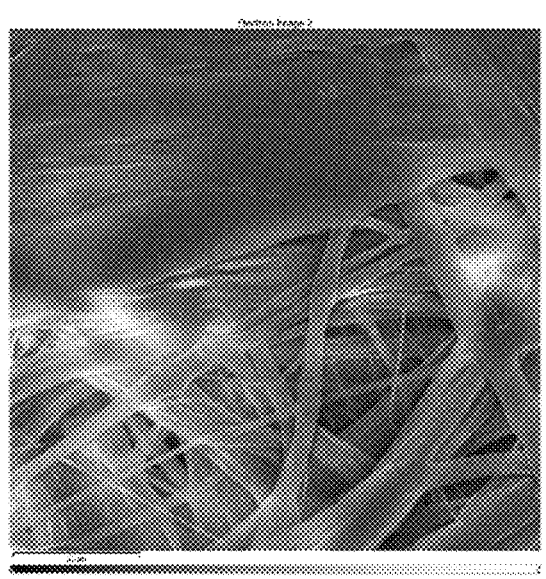
Figure 15B:
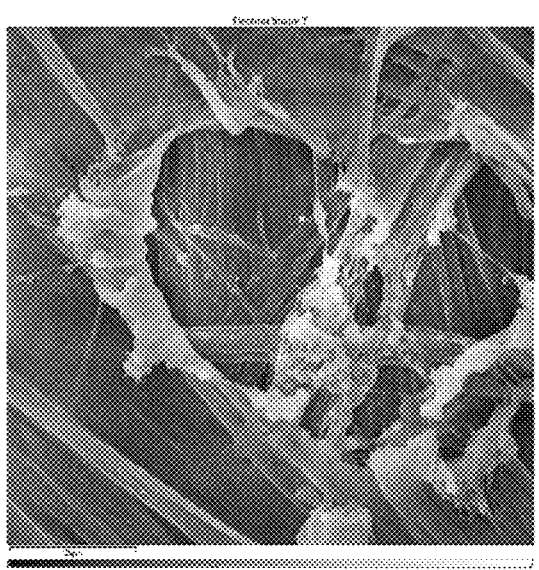

FIGS. 15A-15B are 2000× images of the white and grey areas respectively of a laser marked material using a 3 W ultraviolet laser.

Figure 16A:
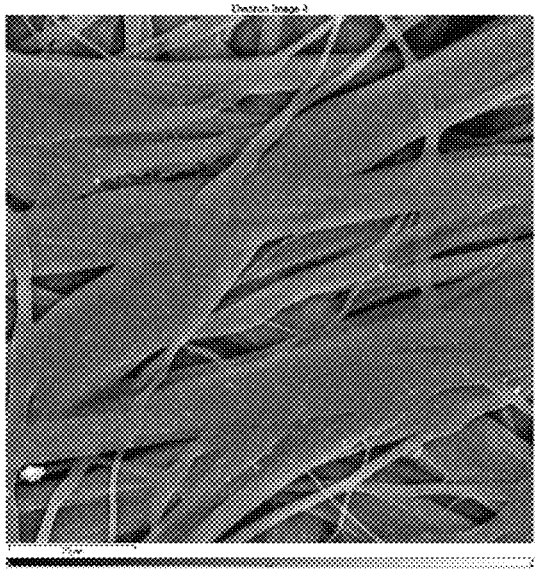
Figure 16B:
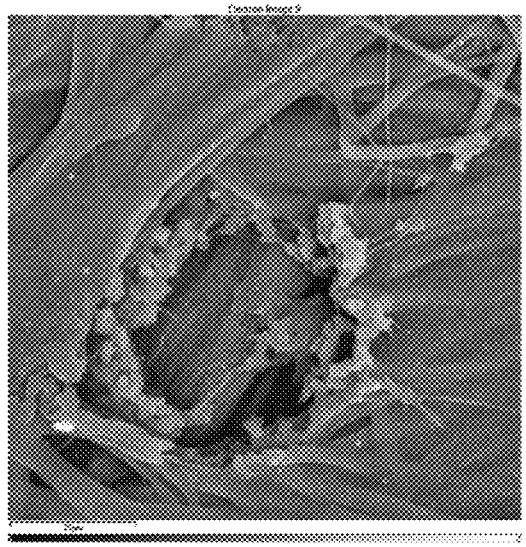

FIGS. 16A-16B are 2000× images of the white and grey areas respectively of a laser marked material using a 3 W ultraviolet laser.

Figure 17A:
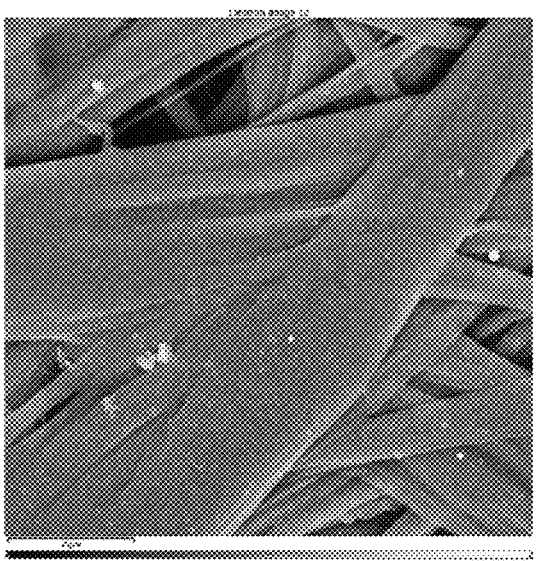
Figure 17B:
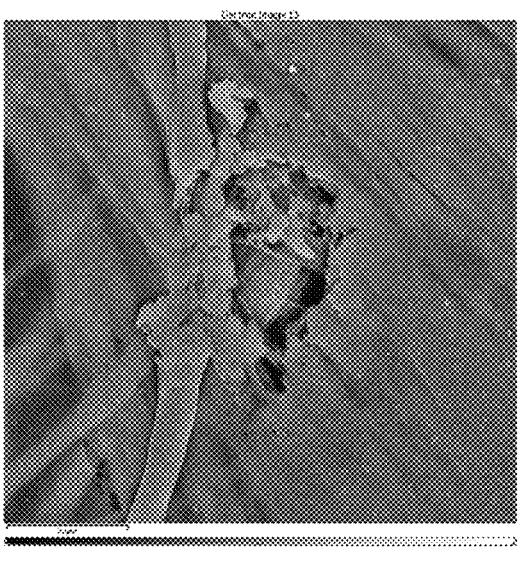

FIGS. 17A-17B are 2000× images of the white and grey areas respectively of a laser marked material using a 3 W ultraviolet laser.

Figure 18A:
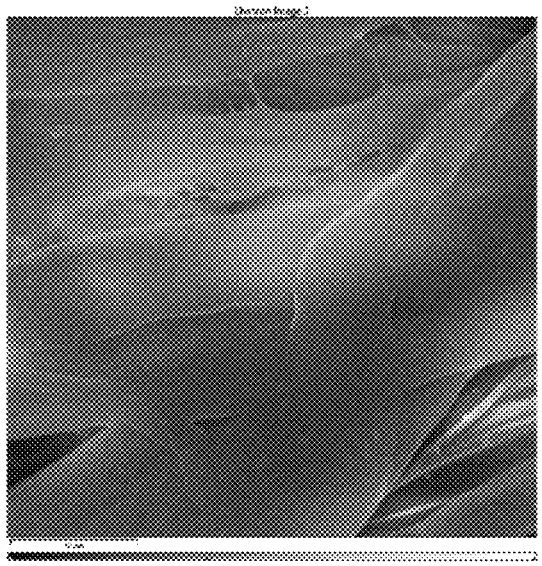
Figure 18B:
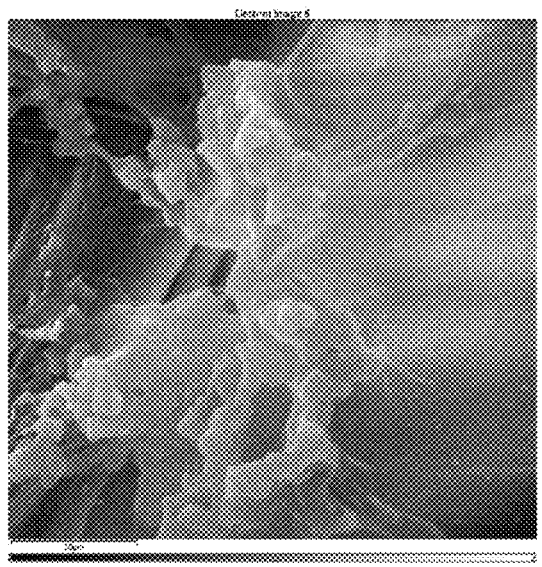

FIG. 18A-18B are 5000× images of the white and grey areas respectively of a laser marked material using a 3 W ultraviolet laser.

Figure 19:
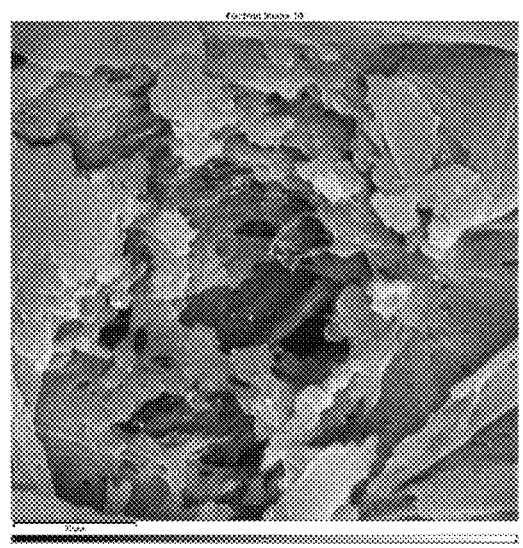

FIG. 19 is a 5000× image of the grey area of a laser marked material using a 3 W ultraviolet laser.

Figure 20:
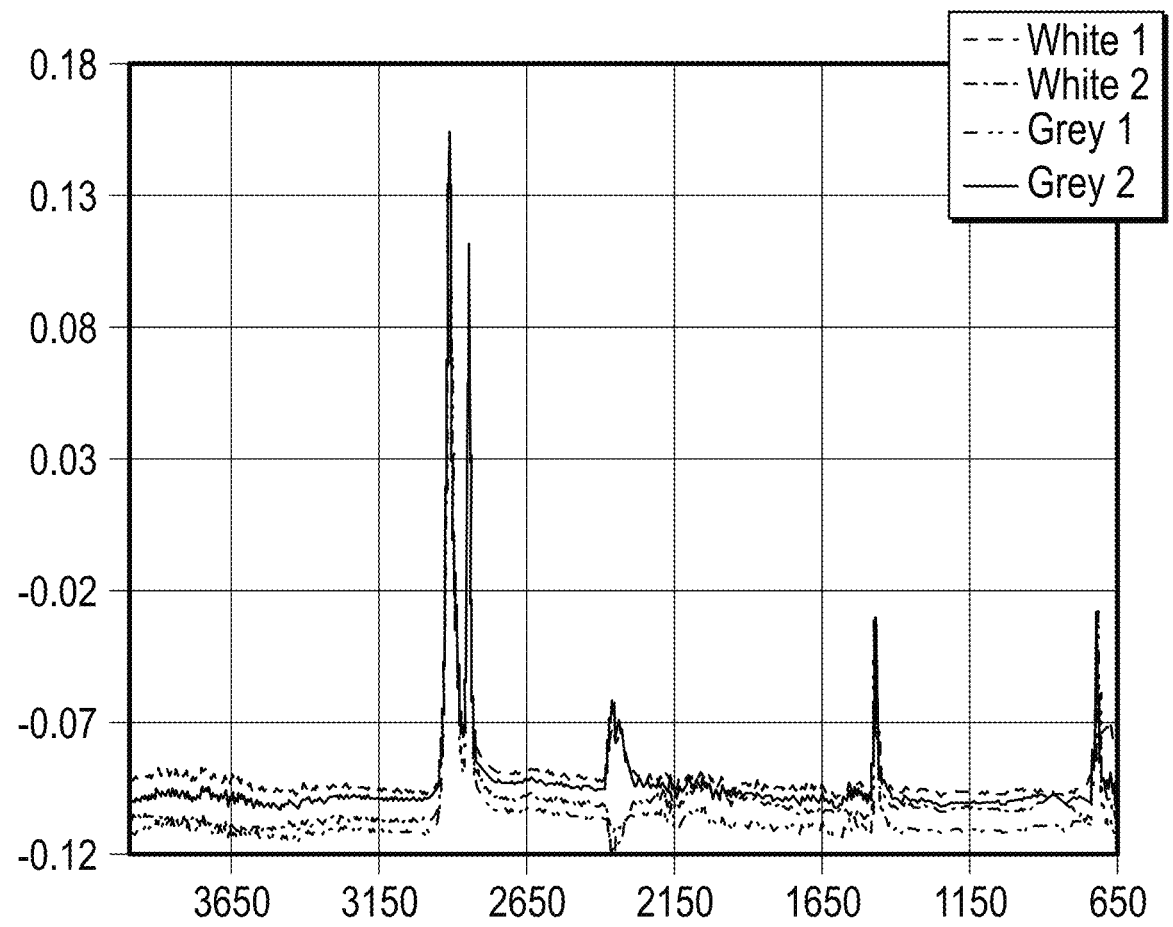
Figure 21:
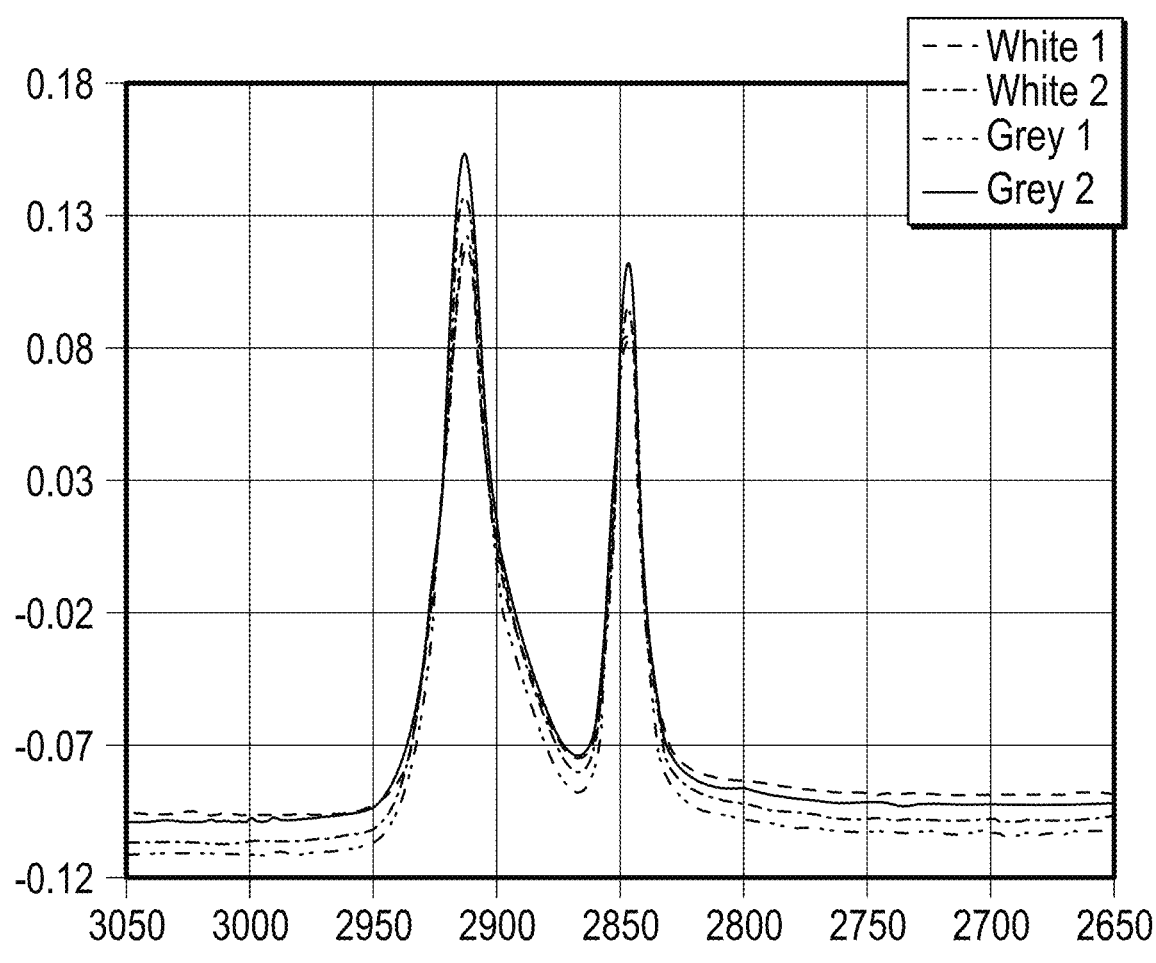
Figure 22:
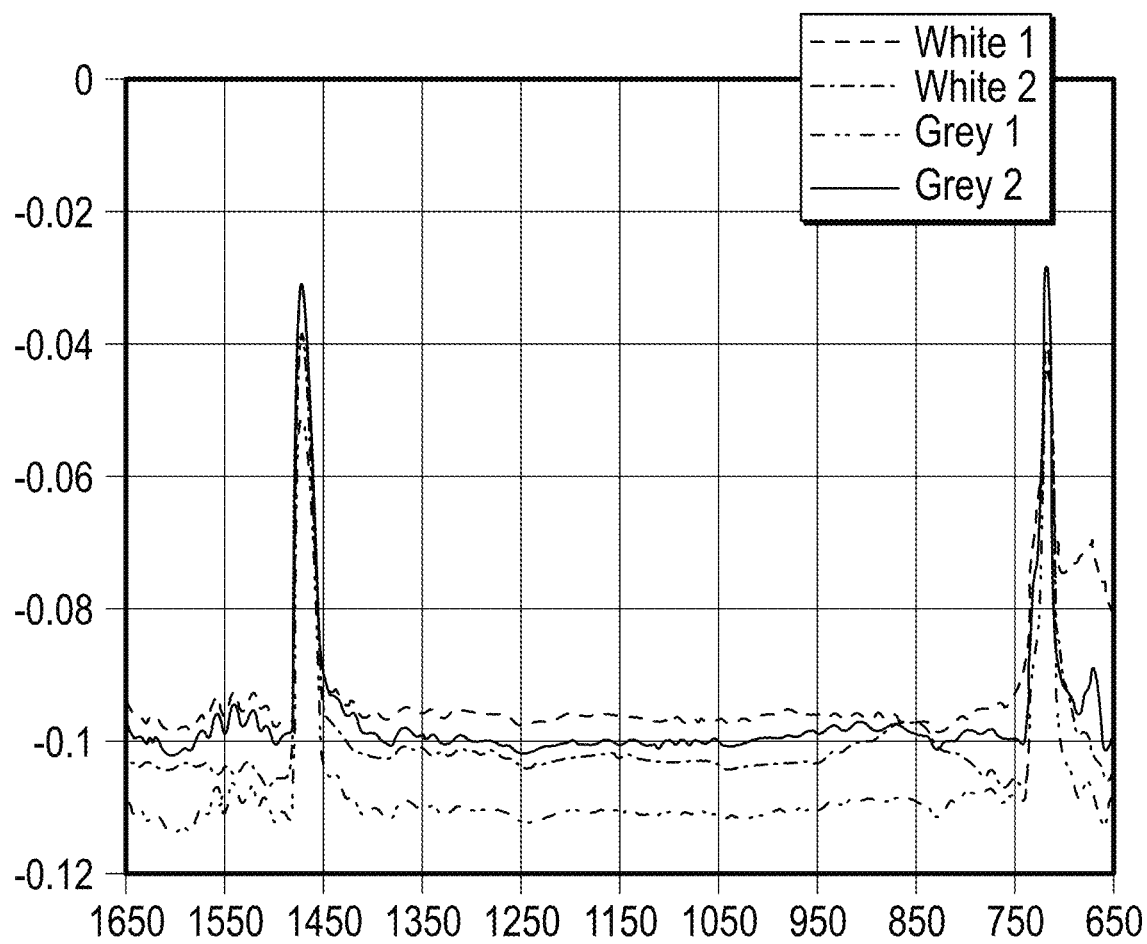

FIGS. 20-22 show comparative Fourier transform infrared (FTIR) spectroscopy spectra of two sections of the white material and two sections of the grey affected sections of the material using a 3 W ultraviolet laser.

Figure 23A:
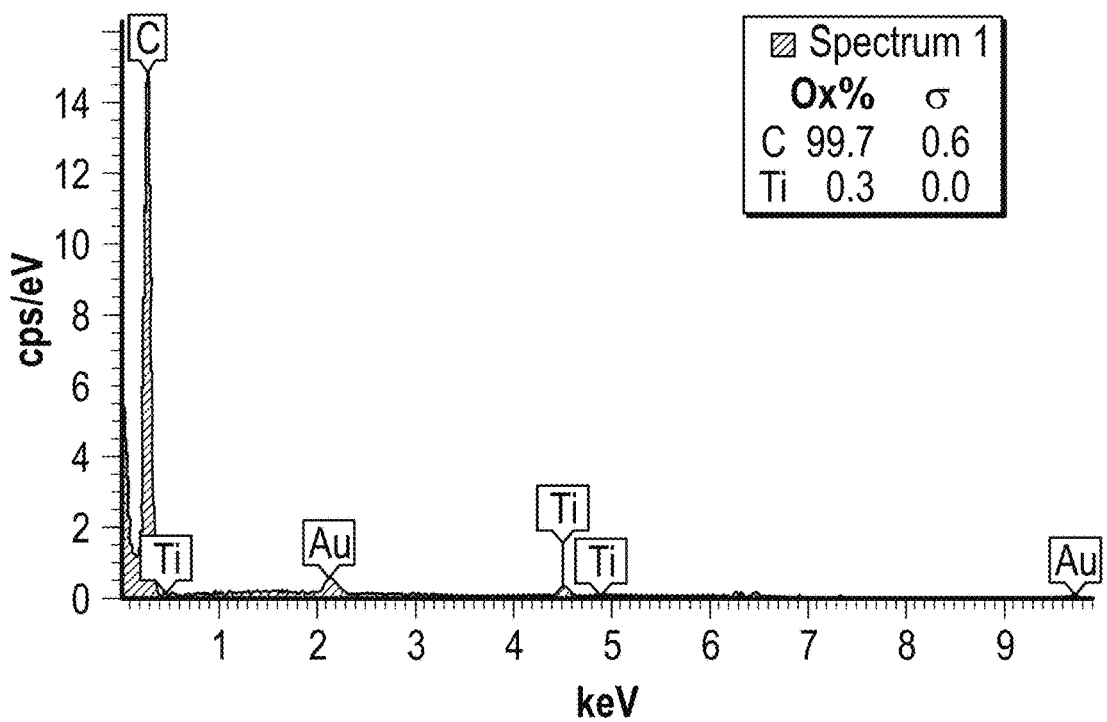
Figure 23B:
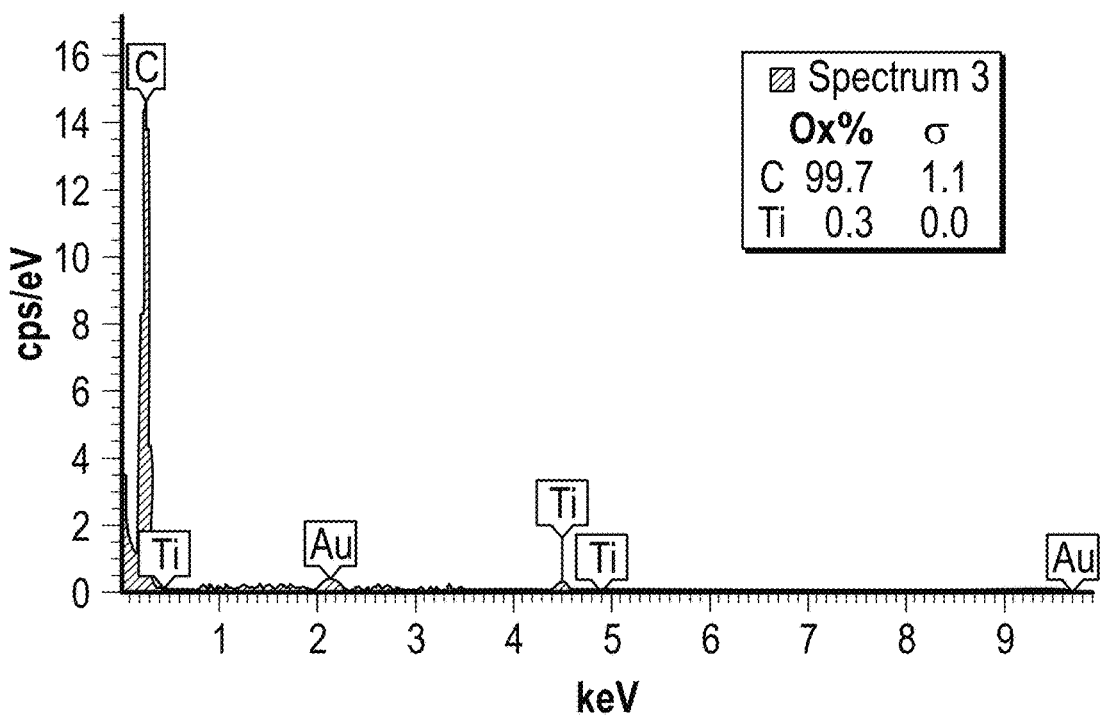

FIGS. 23A and 23B show comparative x-ray spectroscopy (EDX) spectra showing respectively the elemental composition of the white and grey marked sections of the material using a 3 W ultraviolet laser.

Figure 24A:
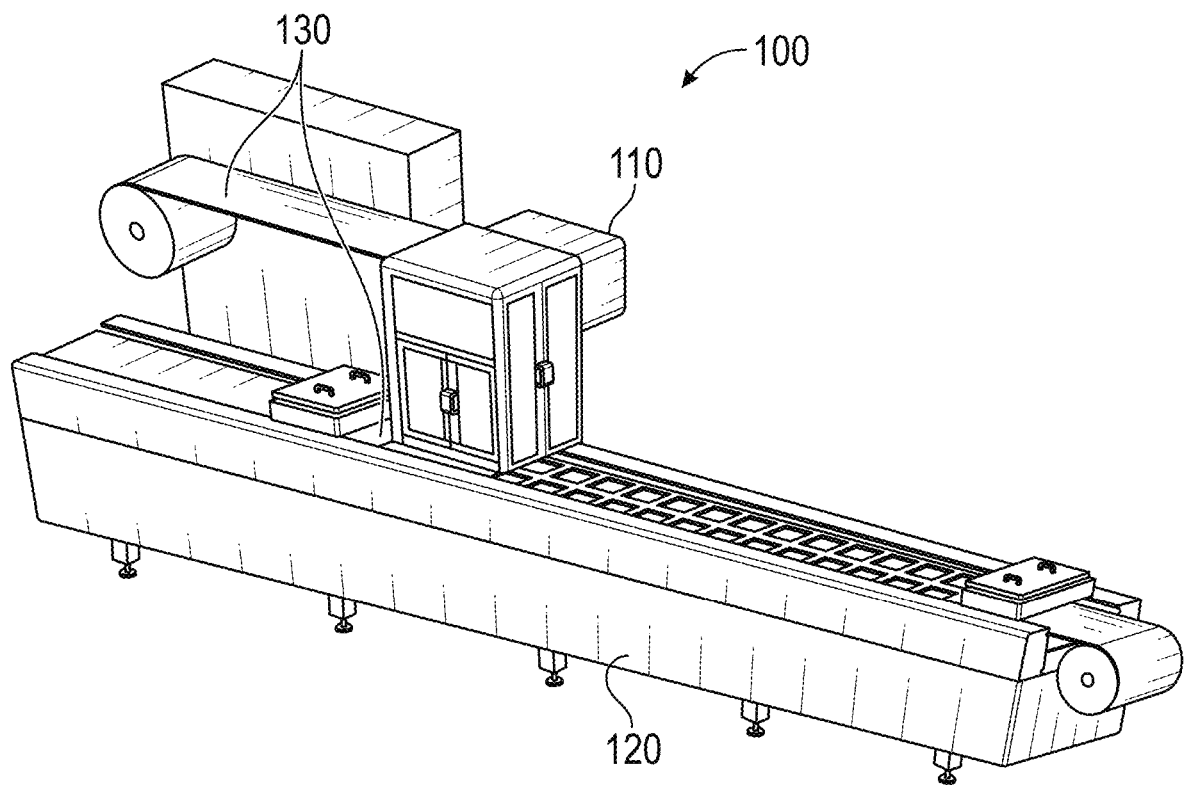
Figure 24B:
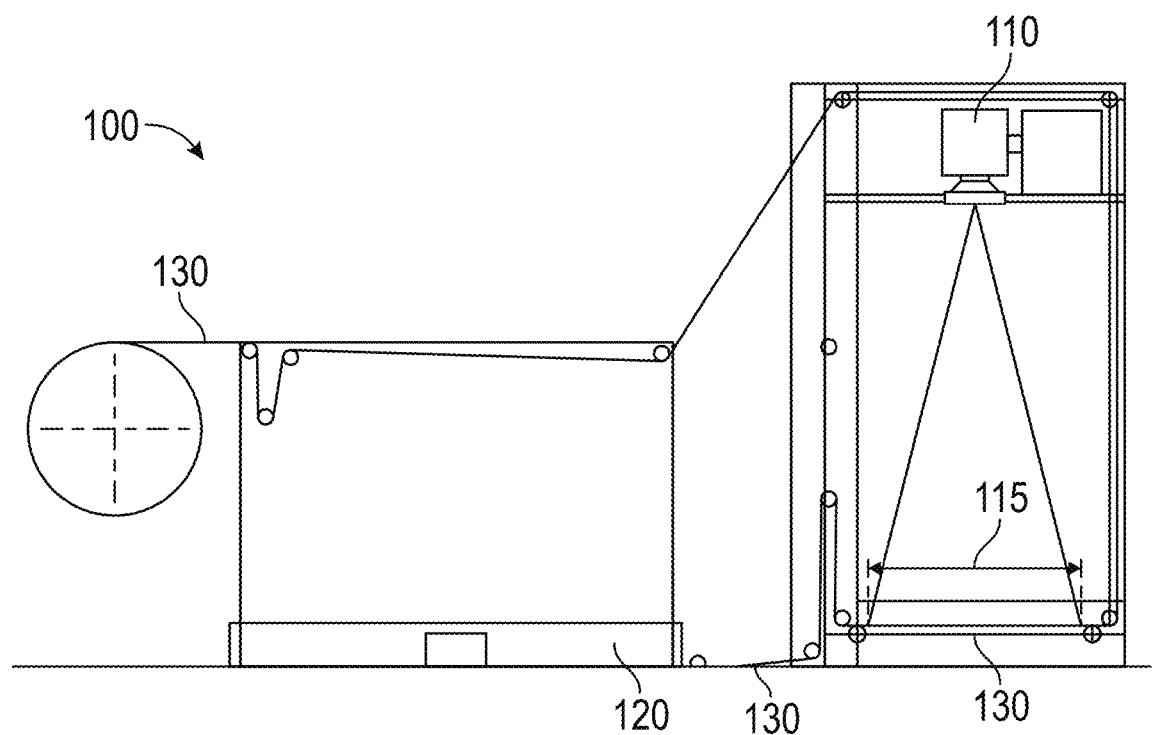

FIGS. 24A and 24B show example systems configured to permanently mark a material.

Figure 25:
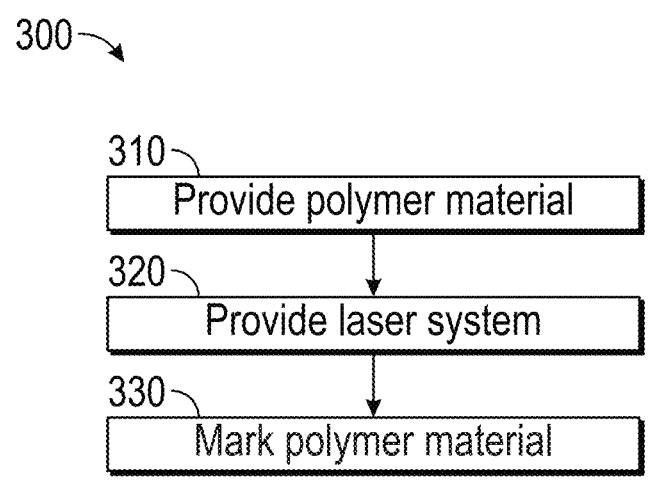

FIG. 25 is a flow diagram schematically illustrating an example method to permanently mark a material.

In the following detailed description of the invention, numerous details, examples, and embodiments of the invention are described. However, it will be clear and apparent to one skilled in the art that the invention is not limited to the embodiments set forth and that the invention can be adapted for any of several applications.

The systems and methods of the present disclosure may be used to place a permanent mark on a material and may comprise the following elements. This disclosure of possible constituent elements is intended to be exemplary only, and it is not intended that this disclosure be used to limit the systems or methods of the present application to just these elements. Persons having ordinary skill in the art relevant to the present disclosure may understand there to be equivalent elements that may be substituted within the present disclosure without changing the essential function or operation of the example systems and methods.

The various elements of the systems and methods of the present disclosure may be related in the following exemplary fashion. It is not intended to limit the scope or nature of the relationships between the various elements and the following examples are presented as illustrative examples only.

DETAILED DESCRIPTION

The marking of text and other graphical characters on polymer materials such as polyolefin based materials, including thin and extruded films, can be performed utilizing inks that adhere to the polymer surface, after any desired pretreatment to lower the surface tension on the marked substrate. This system can be performed utilizing a flexographic printing system that uses fixed information printing plates and a secondary printing system to mark any desired variable information. The printing or marking of small and high definition characters (including 1D and 2D barcode elements) utilizing this method on spunbonded polyolefins (such as DUPONT™ TYVEK® 2FS™ material) is even more difficult with the printing inks due to the uneven surface texture characteristic of the filament elements of these materials, and to the tendency of both the water based and solvent based inks migrating away from the marked character edges from capillary attraction prior to the drying of the inks. This condition allows for marked 1D and 2D barcode elements to not maintain their originally designed shapes and sizes.

Laser marking systems vary in both their wavelengths, output power, and output streams (pulsed or continuous beams). For marking on polymers, and to obtain a visible contrast mark, some laser wavelengths do not perform well or have inherent safety issues when used. For example, wavelengths in the ultraviolet C (UVC) and ultraviolet B (UVB) range (100-300 nm) can be utilized to slowly mark very small targets, e.g., on electronic components, but can be carcinogenic if not shielded properly. Eximer laser light wavelengths up to 351 nm are in the "cold class" of lasers and can be generally produced with low power outputs (5 mW-300 mW) for surgical applications, and do not perform well when utilized for marking of polymers. Pulsed Ultraviolet (UV) lasers at a wavelength of 355 nm and power outputs of 1 W-3 W are in the "cold class" of lasers that can generate a low amount of heat when utilized to mark polymers. This can allow for the marked substrate to be marked without damaging the structure. The lasers in this class can be fitted with optics that provide a small marking field. These lasers can be utilized for generating only one barcode and two short lines of text (e.g., a lot coding system). Green lasers (532 nm wavelength) can be produced with pulsed or continuous operation and with 1 W-50 W power output. These lasers can also mark polymers but may also char, melt, and warp the marked thin film structures. Fiber and $CO_2$ lasers (in the 830 to 1024 nm wavelengths) with power outputs from 1 W to 500 W, are identified as "hot" lasers and can be generally constructed to perform drilling, cutting, and engraving operations on various materials (e.g., operations for thick molded parts with thicknesses ranging from 0.025 inch to 0.060 inch or higher and/or where damage is not an issue at temperatures exceeding 160° C.).

By way of example, some embodiments described herein include methods of permanently marking a polymer material containing an opacification material, such as a polymer structure that contains titanium dioxide ($TiO_2$). Example materials that can be marked include DUPONT™ TYVEK® brand materials (e.g., DUPONT™ TYVEK® 2FS™ material), spunbonded polyolefin (high density polyethylene with titanium dioxide additive), and/or hydro entanglement generated polyolefin (polypropylene) fibrous sheeting, and solid polymer sheeting materials (including but not limited to polycarbonate, polyethylene terephthalate, acryonitrile butadiene styrene, polyvinyl chloride, and other polymers that have an affinity of absorption of the 355 nm wavelength light).

The method may comprise marking the material with a laser system, wherein the laser system can comprise a 355 nm±0.1 nm ultraviolet (UV) system. In other applications, for example with other materials, other laser systems may be used including but not limited to 355±0.5 nm, 355±1 nm, 355±2 nm, 355±3 nm, 355±4 nm, or 355±5 nm systems. Some UV lasers can be used with a low output power (e.g., 1-3 W) so as to not damage the material. In addition, some such lasers may be used at a slow rate to provide the desired marking quality (e.g., clarity, contrast, etc.). Using low output power and slow rates may limit the amount and size of the markings. Methods described herein are capable of permanently marking a large amount of marks on a large field size of the polymer material without limiting the output power of the laser, at a fast rate, and without compromising the integrity of the material.

Examples provided herein can utilize a laser system that can include a solid state nanometer wavelength diode pumped and pulsed unit. In some instances, the laser system can include a variable wattage solid state diode pumped and pulsed unit. The average output power can be any wattage from 1 W to 55 W, or any ranges therein. In various implementations, the average output power can be from 4 W to 55 W, 4 W to 50 W, 4 W to 40 W, 4 W to 30 W, 4 W to 20 W, 5 W to 30 W, 5 W to 20 W, 6 W to 20 W, 7 W to 20 W, 8 W to 20 W, etc. By using an output power of at least 4 W, the laser can be used at a faster speed with the desirable marking quality. In some instances, the laser system can include a beam expander, such as a 2×, 3×, 4×, or 5× beam expander. For example, the laser system can include a series of lenses such that the laser beam can be directed through the lenses to increase or decrease the diameter of the laser beam. The laser beam exiting the laser source can be expanded by multiples (e.g., 2×, 3×, etc.) of its original diameter depending at least in part on the intended application. In various implementations, a 2× beam expander can be particularly desirable because it can optimize the dot or spot size at the work surface. Larger expanders may reduce the dot or spot size at the work surface and reduce the line width and readability of the marking.

In some instances, the laser system can include a dual head Galvo (galvanometer) scan head. For example, the laser system can include two servo motor driven mirrors (e.g., galvos) that deflect the laser beam in two linear directions (e.g., X-Y servo galvanometer scanner with beam deflector) to allow the beam to form a marked character. The laser system can be used at a minimum scan speed. For example, the laser beam can be directed or redirected by the scan head at a minimum speed of 1 meter/second to 20 meters/second, or any ranges formed therein. In various implementations, a minimum scan speed of 3 meters/second can allow for faster marking, and also to help reduce and/or avoid damaging the material at a higher output power. In some instances, the minimum scan speed can be from 3 meters/second to 8 meters/second, 4 meters/second to 8 meters/second, 5 meters/second to 8 meters/second, or 6 meters/second to 8 meters/second. In some instances, too high a rate may reduce the energy per pulse and reduce the ability to generate marking contrast. The laser system can have a pulse frequency. For example, the pulse frequency can be at least 30 KHz (e.g., 30,000 pulses per sec). In some instances, the laser system can have a variable laser frequency from, e.g., 1 to 150 KHz, or any ranges therein, such as 30 to 40 KHz or 30 to 50 KHz. In various implementations, a pulse frequency of at least 30 KHz can help reduce the amount of imparted heat that may damage the material than if using a slower pulse frequency. In some instances, too high a frequency may slow down the ability to mark as the laser pulse energy can reduce as the frequency is increased. The laser system in some implementations can use a focusing lens system (e.g., an F-Theta 810 objective focusing lens) to create marking field sizes of from approx. 100 mm×100 mm to 500 mm×500 mm, resulting in a spot size of from 120 to 100 microns with a pulse energy of 160-400 micro joules per pulse. In some instances, during the marking step, and to control the marked field size, the laser may be positioned a distance of approx. 200-990 mm from the substrate to be marked. The marking speed can depend at least in part on the laser pulse frequency, scan head capacity, field size, font type, lens focal length, and/or character size. The font type can be a vector or raster type font. In some implementations, vector fonts can mark faster than raster type fonts for the same number and size of characters to be marked. The overall character size can be from 0.25 point type to the total focused field size of the laser system. In various implementations, the character size can be from 10 to 15 point type, which can be readable with the human eye. For example, the character size can be from 10 to 14 point type or 10 to 12 point type. In some instances, from 500 to 2500 characters, or any ranges therein (e.g., 500 to 1000, 500 to 1500, or 500 to 2000 characters), with a font size of 10 to 15 point can be marked within 5 seconds, 4 seconds, 3 seconds, 2 seconds, or sometimes 1 second. In some instances, one marking cycle can mark up to 2000 characters with a font size of 10-12 point type within 5 seconds. Some implementations can mark 1 to 25 cycles in a minute (or any ranges therein e.g., 1 to 15, 1 to 12, 1 to 10, 5 to 15, 5 to 12, 5 to 10, etc.) as may be desired by the packaging machines's line speed. Various examples are possible.

Depending at least in part on the pulse frequency, scan speed, and/or focal lengths of lenses, the marking color may be varied from a light grey to a charcoal coloration. In some implementations, if the pulse frequency and/or scan speed is too slow, then the imparted potential energy may begin to cause damage to the material by overheating the base polymer material, causing melting, cratering at the beam contact point, and eventually transforming the polymer into carbon. The carbonized polymer may appear to be dark grey or black in color. While some cratering (e.g., up to a maximum depth of 10 microns, 7 microns, 5 microns, 3 microns, or 1 micron in some cases) can be acceptable for the material and might not physically deteriorate the material, too large of cratering may negatively impact the integrity of the material. In some implementations, if the pulse frequency and/or scan speed is too high, the marking speed and/or contrast of the marks may be diminished. In various instances, the pulse frequency can be balanced with the scan speed and the output power for the desired marking rate and contrast.

In various implementations, the material can be marked with multiple characters (e.g., 500+ characters such as from 500 to 2500 or any ranges therein in 10-15 point font size) and/or a barcode (e.g., a 2D barcode) and/or human readable identification characters. The overall ISO symbol grade can be used to describe the marking quality of a symbol. In some instances, 2D DataMatrix barcode can have a marking quality with an ISO/IEC 15415:2011 symbol grade of at least 2.0, 3.0, or 4.0 for an aperture (mils), light source (nm), and angle (or an equivalent February 2011 ANSI grade of at least C, B, or A) pursuant to the 2015 2D Barcode Verification Process Implementation Guideline per GS1 DataMatrix Guideline Release 2.5.1, Ratified, January 2018. The grades range from 0.0 to 4.0 with 4.0 being the highest or A-B-C-D-F with A being the highest. As an example, the marking quality can be given as the grade/aperture/light/angle (e.g., 3.0/10/660 with the angle assumed to be 45° if not provided). The symbol grade can be the lowest grade out of each individual criteria. In some instances, the barcode can meet the ISO/IEC 15415:2011 standards for one, all, or any combination of the individual criteria of decode, symbol contrast, axis nonuniformity, modulation, grid nonuniformity, unused error correction, fixed pattern damage, and print growth. For the criteria of symbol contrast, a result of 30 to 60% contrast can yield a 4.0 or A grade. Alternatively or additionally, the barcode can meet the May 19, 2015 American Standard AS 9132. In some instances, the barcode can meet the May 19, 2015 American Standard AS 9132 standards for one, all, or any combination of the individual criteria of angle of distortion, filled cells, centre point discrepancy, elongation, number of dots per element, and quiet zone. Alternatively or additionally, the barcode can meet ISO/IEC TR 29158:2020 Direct Part Mark Quality Guideline. In some instances, the barcode can meet ISO/IEC TR 29158:2020 standards for one, all, or any combination of the individual criteria of decode, symbol contrast, axis nonuniformity, modulation, grid nonuniformity, unused error correction, fixed pattern damage, and print growth. Alternatively or additionally, the barcode can meet ISO/IEC TR 29158:2020 standards for the individual criteria of modulation within a cell and/or minimum reflectance.

Example 1

Using Raman spectroscopy testing methods, laser marking on a TYVEK® 2FS™ material was tested to determine the chemistry of a laser mark on the high-density polyethylene (HDPE) sheet, wherein the laser mark was created using an 8 watt UV laser.

First, a white (e.g., unmarked) area of the material sheet was measured using a LabRam HR Evolution spectrometer. A 352 nm wavelength was used as excitation for the Raman spectra, which were collected in the backscattering geometry (180°) under an Olympus microscope. FIG. 1 was acquired from the white area of the sheet shown in FIG. 2. FIG. 1 is a typical spectrum of HDPE, as shown in the overlaid spectra in FIG. 3. The additional bands at 450 and 606 $cm^{-1}$ are the bands of $TiO_2$ in rutile form (see FIG. 4) used to give the TYVEK® material its white color.

Then, a grey area produced by the laser (see FIG. 6) was measured using the same process. FIG. 5 was acquired from the grey area. As shown in FIG. 7 and even better in zoomed in FIG. 8, the $TiO_2$ bands (450 and 606 $cm^{-1}$) are depleted and barely detected, while a very weak broad band was detected at a higher wave number (877 $cm^{-1}$), which could be speculated to be due to a $TiO_3$ ion. Thus, it seems that $TiO_2$ is depleted under the laser action, and it is transformed into other titanium-based species, such as Ti metal and titanate(s). The grey color further suggests that metal Ti is quite probably present in the laser marked area.

Additionally, no decomposition of the polymer into carbon was detected in the laser mark, since no spectra of sp2 bonded carbon (carbon black—see a reference spectrum in FIG. 9) were detected.

FIG. 10 shows an example pair of package labels marked with an 8 watt UV laser in 1.4 seconds. The barcodes produced by the 8 watt laser met the GS1 standard (e.g., GS1 DataMatrix Guideline Release 2.5.1, Ratified, January 2018) for barcodes in all testing requirements (e.g., ISO/IEC 15415:2011, May 19, 2015 American Standard AS 9132, ISO/IEC TR 29158:2020, etc.).

Example 2

Laser marking on a TYVEK®2FS™ material was tested, wherein the laser mark was created using a 20 watt UV laser. The marks produced using the 20 watt laser appear to have very high contrast and do not appear to damage the TYVEK® 2FS™ material. Additionally, the 20 watt samples were able to be generated more quickly than the 8 watt samples from Example 1. As an example, FIG. 11 shows an example pair of package labels marked with a 20 watt UV laser in under 1.0 second. The barcodes produced by the 20 watt laser met the GS1 standard (e.g., GS1 DataMatrix Guideline Release 2.5.1, Ratified, January 2018) for barcodes in all testing requirements (e.g., ISO/IEC 15415:2011, May 19, 2015 American Standard AS 9132, ISO/IEC TR 29158:2020, etc.).

Example 3

As another example, FIG. 12A shows an example of laser marking of a TYVEK® 2FS™ material generated with a 20 watt UV laser. The label (3.5 inches×8.5 inches) included 500+ text characters in 10 point font size, a 10 mm×10 mm barcode, and human readable barcode content. For one cycle, the complete label was replicated 4 times in 2.9 seconds. FIG. 12B shows one of the 4 labels. The marks produced have very high contrast and clarity, and have no cratering or melting of the TYVEK® material. The time to generate the complete labels was sufficient to maintain a packaging machine's line speed at 8-9 cycles per minute. Using an 8 watt UV laser, the label was replicated 4 times in 3.6 second, which was also sufficient to maintain a packaging machine's line speed at 8-9 cycles per minute. FIG. 12C shows one of the 4 labels.

The barcodes produced by both the 8 and 20 watt lasers met the GS1 standard (e.g., GS1 DataMatrix Guideline Release 2.5.1, Ratified, January 2018) for barcodes in all testing requirements (e.g., ISO/IEC 15415:2011, May 19, 2015 American Standard AS 9132, ISO/IEC TR 29158: 2020, etc.). For the 4 barcodes produced by the 8 W laser, the overall ISO grades were DPM4.0/07/660/D, DPM4.0/07/660/30Q, DPM3.0/07/660/D, and DPM4.0/07/660D. The symbol grade is reported as the lowest grade out of each individual criteria. A single grade of 3.0 was recorded for fixed pattern damage for one of the 4 labels with the remainder of the grades being 4.0. The cell contrast ranged from 38%-45% (4.0 or A grade). For the 4 barcodes produced by the 20 W laser, the overall ISO grades were DPM3.0/07/660/30Q, DPM3.0/07/660/30Q, DPM3.0/07/660/D, and DPM3.0/07/660/30Q. Four out of four tests in cell modulation were recorded as 3.0, two out of four tests in fixed pattern damage were recorded as 3.0, and one out of four tests in unused error correction was recorded as 3.5, with the remaining grades recorded as 4.0. The cell contrast ranged from 35%-39% (4.0 or A grade).

Example 4

Laser marking on a TYVEK® material was tested, wherein the laser mark was created using a 3 watt UV laser with a pulse frequency of 40 Hz. Samples were collected and adhered to an SEM sample stub with double sided carbon tape for analysis.

Analysis by scanning electron microscope (SEM) indicates physical alteration of the polyethylene material within the grey marked regions. No elemental changes were observed by energy dispersive x-ray spectrometry (EDX). Analysis of the material by Fourier transform infrared (FTIR) spectroscopy did not clearly indicate a chemical change to the bonded polyethylene. FIGS. 13A-13D shows random laser marked (RLM) images of the two marked sections of the sample showing the change in coloration as a result of the laser marking process. A 500× image comparing the white and grey sections of the material is shown in FIGS. 14A and 14B respectively, while a 2000× image comparing the white and grey sections of the material is shown in FIGS. 15A and 15B respectively. FIGS. 16A-16B and 17A-17B show 2000× (electron backscatter) images comparing the white (FIGS. 16A and 17A) and grey (FIGS. 16B and 17B) sections of the material, wherein the white spots are titanium dioxide deposits. FIGS. 18A and 18B shows 5000× images comparing respectively the white and grey sections of the material, and FIG. 19 shows a 5000× image of the grey section of the material with an area effected by the laser. The characteristics shown in FIG. 19 were not observed on the white material. FIGS. 20-22 show comparative FTIR spectroscopy spectra of two sections of the white material and two sections of the grey affected sections of the material. FIGS. 23A and 23B show comparative EDX spectra showing respectively the elemental composition of the white and grey marked sections of the material. The data is also shown in Table 1 below:

| Peak Region (cm − 1) | White Material Peak Height | Grey Area Peak Height |
|---|---|---|
| 2910 | 0.2026-0.2419 | 0.2342-0.2528 |
| 2845 | 0.1631-0.2000 | 0.1941-0.2107 |
| 1462 | 0.0580-0.0721 | 0.0604-0.0688 |
| 717 | 0.0589-0.0661 | 0.0681-0.0714 |

The data suggested that the darkening observed is the result of thermal damage to the polymer, causing loss of the hydrogen and oxygen atoms leaving carbon, which is known to cause alterations in color. Analysis of pore depth by SEM (focal point depth analysis) indicated that the etched sections extended roughly 0.93 um into the fabric (0.01 μm minimum, 6.6 μm maximum depth).

Thus, this example shows cratering less than the 10 micron maximum allowable, but it also provides evidence of carbonization of the polymer and melting/cratering generated as a result of the 3 watt system.

Example 5

A comparison between a small power and small field sized laser is shown in the following example. Markings were generated using a 2 watt UV laser including a 3× beam expander and a dual head Galvo scan head. The laser was used at a scan speed of 3 meters/second, and a variable laser pulse frequency at 30 KHz. A single label as that shown in FIG. 12B or FIG. 12C (not replicated 4 times) was generated in 12.38 seconds. The barcode alone (without 500 characters) was produced in 0.972 seconds. The barcode yielded an overall symbol grade of DPM2.0/11/660/D. The fixed pattern damage had a C grade, which is the lowest acceptable grade. The cell contrast was at 29% (B grade). The contrast in the label could not compare to the higher power 8 W and 20 W lasers in Example 3. To achieve a similar contrast, the marking speed decreased even further and damage to the substrate was demonstrated.

Example Marking System

FIG. 24A shows an example system configured to permanently mark a material. The system 100 includes a laser system 110 and a packaging machine 120. The laser system 110 is shown mounted to a loading bed of the packaging machine 120. FIG. 24B shows another example system 100 with the laser system 110 in communication with the packaging machine 120. In both figures, the path of the material 130 can be seen from the roll of material, into the marking field 115 of the laser system 110, and out of the marking field 115 of the laser system 110. For example, the packaging machine 120 can be configured to hold (intermittently in some instances) a portion of the material 130 within the marking field 115 of the laser system 110 for a period of time (e.g., 4-60 seconds). Upon receiving a signal from the packaging machine 120, the laser system 110 can be configured to mark the portion of the material 130 within the marking field 115 of the laser system 110 within the period of time. The laser system 110 can include any laser system, including any laser system described herein. Upon receiving a signal from the laser system 110, the packaging machine 120 can be configured to feed the marked portion out of the marking field 115 of the laser system 110 and feed a successive portion of the material 130 into the marking field 115 of the laser system 110. In various implementations, the laser system 110 can be configured to mark the respective portion of the material 130 and the packaging machine 120 can be configured to feed the respective marked portion of the material 130 out of the marking field 115 of the laser system 110 for a designated number of cycles (e.g., 1 to 25 cycles/minute or any ranges therein such as 1 to 15 cycles, 1 to 12 cycles, 1 to 10 cycles, 5 to 15 cycles, 5 to 12 cycles, 5 to 10 cycles, etc.).

As an example, the laser system 110 can be in a fixed mounted position above the material 130 to be marked. The material 130 can be a continuous web of material that is presented to the laser system 110 and is in a stopped configuration when the marking is to be performed. Labeling artwork can be generated by the owner of the equipment via label generating software (e.g., Adobe Illustrator, Corel Draw, etc.) in, e.g., a .dxf type file format, and stored in a mainframe network computer, a PC, or laptop computer. The laser system can utilize a control system to process the input data and control the laser and galvanometers. For example, the artwork file can be downloaded to the laser controller or to a company network that is connected to either the PC computer or the laser controller. When the laser system 110 has received the downloaded computer file, it can wait for the packaging machine 120 to provide a "start" signal. Once received, the laser system 110 can execute the artwork marking onto the material 130. Once completed, the laser system 110 can signal the packaging machine 120 to continue with its designated operations. This signal exchange can be repeated between the laser system 110 and packaging machine 120 until the designated number of machine cycles has been accomplished. Other examples are possible.

In some implementations, the system 100 may further include a temperature control system, e.g., to control the temperature of the laser system 110. In some instances, the temperature control system can include a liquid coolant chilling system.

Example Method

FIG. 25 is a flow diagram schematically illustrating an example method of permanently marking a material. The method 300 can include providing a polymer material as shown in block 310. The polymer material can include, but not limited to any of the polymers described herein, e.g., a polymer material containing an opacification material. As examples, the polymer material can include spunbound polyolefin or hydro entanglement generated polyolefin fibrous sheeting. For example, the polymer material can include high density polyethylene such as DUPONT™ TYVEK® brand materials (e.g., DUPONT™ TYVEK®2FS™ material). In some instances, the polymer material can include solid polymer sheeting. In some instances, the polymer material can include polycarbonate, polyethylene terephthalate, acryonitrile butadiene styrene, or polyvinyl chloride. In some instances, the opacification material can include titanium dioxide.

The method 300 can include providing a laser system as shown in block 320. The laser system can include an ultraviolet laser. For example, the laser system can comprise a 355±0.1 nm ultraviolet laser. In other applications, for example with other materials, other laser systems may be used including but not limited to 355±0.5 nm, 355±1 nm, 355±2 nm, 355±3 nm, 355±4 nm, or 355±5 nm systems. The laser system can include a diode pumped and pulsed solid state laser. In some implementations, the laser system can have an average output power of 1 to 55 W. For example, the output power can be from 4 W to 55 W, 4 W to 50 W, 4 W to 40 W, 4 W to 30 W, 4 W to 20 W, 5 W to 30 W, 5 W to 20 W, 6 W to 20 W, 7 W to 20 W, 8 W to 20 W, etc.

As shown in block 330, the method 300 can include marking the polymer material with the laser system. In various implementations, the laser system can mark the polymer material at a minimum scan speed of 1 meter/second to 20 meters/second. For example, the minimum scan speed can be from 3 meters/second to 8 meters/second (e.g., from 4 meters/second to 8 meters/second, 5 meters/second to 8 meters/second, or 6 meters/second to 8 meters/second) and/or a minimum pulse frequency of 1 to 150 KHz (e.g., 30 KHz to 40 KHz or 30 KHz to 50 KHz). In various methods, the laser system can produce less than 10 microns, 7 microns, 5 microns, 3 microns, or 1 micron of cratering in the polymer material.

Various methods described herein have the capability to provide multiple lines of marks including barcodes (e.g., 1D or 2D barcode) at a fast rate. Some implementations are capable of marking 500 characters with a 10 to 15 point font type, a 2D barcode, and human readable identification characters in the polymer material within 5 seconds, 4 seconds, 3 seconds, 2 seconds, or 1 second. In example methods, a 2D barcode can be marked with a marking quality with an ISO/IEC 15415:2011 symbol grade of at least 2.0, 3.0, or 4.0 for an aperture, light, and angle or a February 2011 ANSI grade of at least C, B, or A pursuant to the 2015 2D Barcode Verification Process Implementation Guideline per GS1 DataMatrix Guideline Release 2.5.1, Ratified, January 2018. In some instances, the barcode can meet the ISO/IEC 15415:2011 standards for one, all, or any combination of the individual criteria of decode, symbol contrast, axis nonuniformity, modulation, grid nonuniformity, unused error correction, fixed pattern damage, and print growth. For the criteria of symbol contrast, a result of 30 to 60% contrast can yield a 4.0 or A grade. Alternatively or additionally, the barcode can meet the May 19, 2015 American Standard AS 9132. In some instances, the barcode can meet the May 19, 2015 American Standard AS 9132 standards for one, all, or any combination of the individual criteria of angle of distortion, filled cells, centre point discrepancy, elongation, number of dots per element, and quiet zone. Alternatively or additionally, the barcode can meet ISO/IEC TR 29158:2020 Direct Part Mark Quality Guideline. In some instances, the barcode can meet ISO/IEC TR 29158:2020 standards for one, all, or any combination of the individual critera of decode, symbol contrast, axis non-uniformity, modulation, grid nonuniformity, unused error correction, fixed pattern damage, and print growth. Alternatively or additionally, the barcode can meet ISO/IEC TR 29158:2020 standards for the individual criteria of modulation within a cell and/or minimum reflectance.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of permanently marking a polymer material containing an opacification material, wherein the method comprises:
   providing a polymer material containing an opacification material;
   providing a laser system, wherein the laser system comprises a pulsed 352 nm to 355 nm ultraviolet laser with an average output power of 4 to 55 W; and
   marking the polymer material with the pulsed 352 nm to 355 nm ultraviolet laser system at a minimum scan speed of 5 meters/second and a minimum pulse frequency of 30 KHz to produce a laser mark in or on the polymer material,
   wherein no decomposition of the polymer material is detected in the laser mark after spectrometric analysis, and
   wherein the opacification material is titanium dioxide.

2. The method of claim 1, wherein the laser system is capable of marking 500 characters in 10 to 15 point font, a 2D barcode, and human readable identification characters in the polymer material within 5 seconds.

3. The method of claim 2, wherein the laser system can mark the 500 characters, the 2D barcode, and the human readable identification characters in the polymer material within 3 seconds.

4. The method of claim 1, wherein the laser system can mark a 2D barcode in the polymer material.

5. The method of claim 4, wherein the 2D barcode has a marking quality with an ISO/IEC 15415:2011 symbol grade of at least 2.0, 3.0, or 4.0 for an aperture, light, and angle or a February 2011 ANSI grade of at least C, B, or A pursuant to the 2015 2D Barcode Verification Process Implementation Guideline per GS1 DataMatrix Guideline Release 2.5.1, Ratified, January 2018.

6. The method of claim 4, wherein the 2D barcode meets ISO/IEC 15415:2011 standards for one or more criteria selected from the group consisting of decode, symbol contrast, axis nonuniformity, modulation, grid nonuniformity, unused error correction, fixed pattern damage, and print growth.

7. The method of claim 4, wherein the 2D barcode meets May 19, 2015, American Standard AS 9132.

8. The method of claim 4, wherein the 2D barcode meets May 19, 2015, American Standard AS 9132 standards for one or more criteria selected from the group consisting of angle of distortion, filled cells, center point discrepancy, elongation, number of dots per element, and quiet zone.

9. The method of claim 4, wherein the 2D barcode meets ISO/IEC TR 29158:2020 Direct Part Mark Quality Guidelines.

10. The method of claim 4, wherein the 2D barcode meets ISO/IEC TR 29158:2020 standards for one or more criteria selected from the group consisting of decode, symbol contrast, axis nonuniformity, modulation, grid nonuniformity, unused error correction, fixed pattern damage, and print growth.

11. The method of claim 4, wherein the 2D barcode meets ISO/IEC TR 29158:2020 standards for individual criteria of modulation within a cell and/or minimum reflectance.

12. The method of claim 1, wherein the polymer material comprises spunbonded polyolefin or hydro entanglement generated polyolefin fibrous sheeting.

13. The method of claim 1, wherein the polymer material comprises a polyolefin selected from the group consisting of a high density polyethylene and a polypropylene.

14. The method of claim 1, wherein the polymer material comprises a solid polymer sheeting.

15. The method of claim 1, wherein the polymer material comprises polycarbonate, polyethylene terephthalate, acrylonitrile butadiene styrene, or polyvinyl chloride.

16. A polymer-marking system configured to permanently mark a polymer material containing an opacification material, wherein the polymer-marking system comprises:
   a laser system comprising a pulsed 352 nm to 355 nm ultraviolet laser of average output power of 4 to 55 W, wherein the laser system has a marking field, wherein the laser system operates at a minimum scan speed of 5 meters/second and a minimum pulse frequency of 30 KHz for producing within the marking field a laser mark in or on the polymer material; and
   a packaging machine in operational communication with the laser system, wherein the packaging machine is adapted and configured to hold a portion of a polymer material containing an opacification material within the marking field of the pulsed 352 nm to 355 nm ultraviolet laser system for a predetermined amount of time for producing a laser mark on the polymer material in the marking field,
   wherein, upon receiving a signal from the packaging machine, the laser system is adapted and configured to laser mark the portion of the polymer material containing the opacification material within the marking field of the laser system within the predetermined amount of time for producing the laser mark on the polymer material in the marking field,
   wherein no decomposition of the polymer material is detected in the laser mark after spectrometric analysis,
   wherein, upon receiving a signal from the laser system, the packaging machine is adapted and configured to feed the laser marked portion out of the marking field of the laser system and feed a first successive portion of a plurality of successive portions of the polymer material containing the opacification material into the marking field of the laser system,
   wherein the laser system is adapted and configured to mark each successive portion of the plurality of successive portions of the polymer material containing the opacification material,
   wherein the packaging machine is adapted and configured to feed each successive laser marked portion of the polymer material out of the marking field of the laser system for a predetermined number of cycles, and
   wherein the opacification material is titanium dioxide.

17. The polymer-marking system of claim 16, wherein the predetermined amount of time is 4 seconds or less.

18. The polymer-marking system of claim 16, wherein the number of cycles is at least 5 cycles.

19. The polymer-marking system of claim 16, wherein the number of cycles ranges from 1 to about 12 cycles.

20. The polymer-marking system of claim 16, wherein the number of cycles ranges from about 5 to about 15 cycles.

21. The polymer-marking system of claim 16, further including a temperature control system comprising a liquid coolant chilling system adapted and configured to controllably maintain a predetermined operational temperature for the laser system.

22. The polymer-marking system of claim 16, wherein the pulse frequency ranges from about 30 to about 50 KHz.

\* \* \* \* \*